United States Patent
Berkel et al.

(10) Patent No.: US 12,469,876 B2
(45) Date of Patent: Nov. 11, 2025

(54) HIGH GREEN DENSITY CERAMICS FOR BATTERY

(71) Applicant: QUANTUMSCAPE BATTERY, INC., San Jose, CA (US)

(72) Inventors: Kim Van Berkel, San Jose, CA (US); Patrick Jeffries, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 789 days.

(21) Appl. No.: 17/792,107

(22) PCT Filed: Jan. 15, 2021

(86) PCT No.: PCT/US2021/013742
§ 371 (c)(1),
(2) Date: Jul. 11, 2022

(87) PCT Pub. No.: WO2021/146633
PCT Pub. Date: Jul. 22, 2021

(65) Prior Publication Data
US 2023/0083614 A1    Mar. 16, 2023

Related U.S. Application Data

(60) Provisional application No. 62/961,611, filed on Jan. 15, 2020.

(51) Int. Cl.
*H01M 10/0562* (2010.01)
*C04B 35/486* (2006.01)
(Continued)

(52) U.S. Cl.
CPC .... *H01M 10/0562* (2013.01); *C04B 35/62218* (2013.01); *C04B 35/6264* (2013.01); *C04B 35/62655* (2013.01); *C04B 35/6268* (2013.01); *C04B 41/0072* (2013.01); *C04B 2235/6025* (2013.01); *C04B 2235/606* (2013.01); *C04B 2235/608* (2013.01); *C04B 2235/658* (2013.01); *C04B 2235/77* (2013.01)

(58) Field of Classification Search
CPC ........................ C04B 35/486; H01M 10/0562
See application file for complete search history.

(56) References Cited

U.S. PATENT DOCUMENTS

| 4,259,061 A | 3/1981 | Dubetsky |
| 4,340,436 A | 7/1982 | Dubetsky et al. |

(Continued)

FOREIGN PATENT DOCUMENTS

| CN | 1746757 A | 3/2006 |
| CN | 101518164 A | 8/2009 |

(Continued)

OTHER PUBLICATIONS

US 11,177,503 B2, 11/2021, Holme et al. (withdrawn)
(Continued)

*Primary Examiner* — Matthew E. Hoban
(74) *Attorney, Agent, or Firm* — Squire Patton Boggs (US) LLP

(57) ABSTRACT

Set forth herein are processes and materials for making ceramic thin green tapes by casting ceramic source powders and precursor reactants, binders, and functional additives into unsintered thin green tapes in a non-reactive environment.

17 Claims, 4 Drawing Sheets

(51) Int. Cl.
*C04B 35/622* (2006.01)
*C04B 35/626* (2006.01)
*C04B 41/00* (2006.01)

(56) References Cited

U.S. PATENT DOCUMENTS

| | | | |
|---|---|---|---|
| 4,492,783 A | 1/1985 | Tanaka et al. |
| 4,878,838 A | 11/1989 | Verheyden, Jr. |
| 5,014,763 A | 5/1991 | Frank |
| 5,130,067 A | 7/1992 | Flaitz et al. |
| 5,250,243 A | 10/1993 | Allaire et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,915,958 A | 6/1999 | Kurie |
| 5,922,493 A | 7/1999 | Humphrey, Jr. et al. |
| 6,277,524 B1 | 8/2001 | Kanno |
| 6,306,336 B1 | 10/2001 | Hrezo et al. |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,514,072 B1 | 2/2003 | Bencic |
| 6,561,799 B2 | 5/2003 | Baudry et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 7,947,213 B2 | 5/2011 | Badding et al. |
| 8,092,941 B2 | 1/2012 | Weppner et al. |
| 8,235,710 B2 | 8/2012 | Bloemacher et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,375,734 B2 | 2/2013 | Hall et al. |
| 8,425,225 B2 | 4/2013 | Pasquinet et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,287,106 B1 | 3/2016 | Miao et al. |
| 9,362,546 B1 | 6/2016 | Donnelly et al. |
| 9,790,121 B2 | 10/2017 | Abramov et al. |
| 9,806,372 B2 | 10/2017 | Holme et al. |
| 9,966,630 B2 | 5/2018 | Cheng et al. |
| 9,970,711 B2 | 5/2018 | Iyer et al. |
| 10,008,736 B2 | 6/2018 | Winoto et al. |
| 10,008,742 B2 | 6/2018 | Holme et al. |
| 10,026,990 B2 | 7/2018 | Badding et al. |
| 10,103,405 B2 | 10/2018 | Choi et al. |
| 10,155,667 B2 | 12/2018 | Badding et al. |
| 10,211,481 B2 | 2/2019 | Budding et al. |
| 10,283,811 B2 | 5/2019 | Badding et al. |
| 10,290,895 B2 | 5/2019 | Holme et al. |
| 10,305,141 B2 | 5/2019 | Choi et al. |
| 10,347,936 B2 | 7/2019 | Choi et al. |
| 10,347,937 B2 | 7/2019 | Beck et al. |
| 10,361,455 B2 | 7/2019 | Allenic et al. |
| 10,396,396 B2 | 8/2019 | Badding et al. |
| 10,403,931 B2 | 9/2019 | Holme et al. |
| 10,403,932 B2 | 9/2019 | Choi et al. |
| 10,422,581 B2 | 9/2019 | Iyer et al. |
| 10,431,806 B2 | 10/2019 | Donnelly et al. |
| 10,431,850 B2 | 10/2019 | Choi et al. |
| 10,439,251 B2 | 10/2019 | Holme et al. |
| 10,486,332 B2 | 11/2019 | Badding et al. |
| 10,563,918 B2 | 2/2020 | Iyer et al. |
| 10,581,115 B2 | 3/2020 | Badding et al. |
| 10,651,502 B2 | 5/2020 | Holme et al. |
| 10,746,468 B2 | 8/2020 | Iyer et al. |
| 10,766,165 B2 | 9/2020 | Badding et al. |
| 10,804,564 B2 | 10/2020 | Allenic et al. |
| 10,840,544 B2 | 11/2020 | Holme et al. |
| 10,862,161 B2 | 12/2020 | Choi et al. |
| 10,875,212 B2 | 12/2020 | Badding et al. |
| 10,967,539 B2 | 4/2021 | Badding et al. |
| 11,014,822 B2 | 5/2021 | Badding et al. |
| 11,111,155 B1 | 9/2021 | Badding et al. |
| 11,139,503 B2 | 10/2021 | Karpenko et al. |
| 11,148,321 B2 | 10/2021 | Badding et al. |
| 11,158,842 B2 | 10/2021 | Donnelly et al. |
| 11,158,880 B2 | 10/2021 | Chao et al. |
| 11,165,096 B2 | 11/2021 | Allenic et al. |
| 11,171,357 B2 | 11/2021 | Choi et al. |
| 11,171,358 B2 | 11/2021 | Holme et al. |
| 11,600,850 B2 | 3/2023 | Chao et al. |
| 2002/0054419 A1 | 5/2002 | Beteille et al. |
| 2002/0182556 A1 | 12/2002 | Baudry et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0042922 A1 | 3/2004 | Rasouli et al. |
| 2004/0074338 A1 | 4/2004 | Kuhn et al. |
| 2004/0191617 A1 | 9/2004 | Visco et al. |
| 2005/0016839 A1 | 1/2005 | Horne et al. |
| 2006/0120160 A1 | 6/2006 | Park et al. |
| 2006/0197245 A1 | 9/2006 | Cheng et al. |
| 2007/0015061 A1 | 1/2007 | Klaassen |
| 2007/0117026 A1 | 5/2007 | Kumar et al. |
| 2007/0148553 A1 | 6/2007 | Weppner et al. |
| 2007/0231704 A1 | 10/2007 | Inda |
| 2008/0145751 A1 | 6/2008 | Ogumi et al. |
| 2008/0199822 A1 | 8/2008 | Blomacher et al. |
| 2009/0069740 A1 | 3/2009 | Visco et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0298001 A1 | 12/2009 | Klein et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0062385 A1 | 3/2010 | Pasquinet et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0247154 A1 | 10/2012 | Abramov et al. |
| 2012/0276439 A1 | 11/2012 | Fujita et al. |
| 2013/0085055 A1 | 4/2013 | Raj et al. |
| 2013/0122364 A1 | 5/2013 | Kim et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0288875 A1 | 10/2013 | Miyagawa et al. |

(56) References Cited

U.S. PATENT DOCUMENTS

| | | |
|---|---|---|
| 2013/0344416 A1 | 12/2013 | Sakamoto et al. |
| 2014/0042922 A1 | 2/2014 | Wu et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0113187 A1 | 4/2014 | Winoto et al. |
| 2014/0120409 A1 | 5/2014 | Ouchi et al. |
| 2014/0120421 A1 | 5/2014 | Ouchi et al. |
| 2014/0134438 A1 | 5/2014 | Gadkaree et al. |
| 2014/0134483 A1 | 5/2014 | Ouchi et al. |
| 2014/0154586 A1 | 6/2014 | Hayashi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0212728 A1 | 7/2014 | Kaneda et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056520 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0172658 A1 | 6/2016 | Donnelly et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2016/0375607 A1 | 12/2016 | Badding et al. |
| 2017/0005367 A1 | 1/2017 | Van Berkel et al. |
| 2017/0022112 A1 | 1/2017 | Karpenko et al. |
| 2017/0054139 A1 | 2/2017 | Kerkamm |
| 2017/0062873 A1 | 3/2017 | Iyer et al. |
| 2017/0162901 A1 | 6/2017 | Chen et al. |
| 2017/0183265 A1 | 6/2017 | Badding et al. |
| 2017/0210634 A1 | 7/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0104848 A1 | 4/2018 | Badding et al. |
| 2018/0301754 A1 | 10/2018 | Badding et al. |
| 2018/0375149 A1 | 12/2018 | Beck et al. |
| 2019/0077674 A1 | 3/2019 | Badding et al. |
| 2019/0207252 A1 | 7/2019 | Badding et al. |
| 2019/0214678 A1 | 7/2019 | Hwang et al. |
| 2019/0245178 A1 | 8/2019 | Cao et al. |
| 2019/0260073 A1 | 8/2019 | Chao et al. |
| 2019/0363398 A1 | 11/2019 | Badding et al. |
| 2020/0031014 A1 | 1/2020 | Badding et al. |
| 2020/0083562 A1 | 3/2020 | Kim et al. |
| 2020/0144660 A1 | 5/2020 | Schneider et al. |
| 2020/0266442 A1 | 8/2020 | Badding et al. |
| 2020/0309454 A1 | 10/2020 | Kamei et al. |
| 2020/0365897 A1 | 11/2020 | Badding et al. |
| 2021/0020932 A1 | 1/2021 | Badding et al. |
| 2021/0047243 A1 | 2/2021 | Badding et al. |
| 2021/0202983 A1 | 7/2021 | Chao et al. |
| 2021/0242495 A1 | 8/2021 | Kim et al. |
| 2021/0380430 A1 | 12/2021 | Badding et al. |
| 2021/0402646 A1 | 12/2021 | Badding et al. |
| 2022/0149369 A1 | 5/2022 | Badding et al. |
| 2022/0166062 A1 | 5/2022 | Kim et al. |
| 2022/0181628 A1 | 6/2022 | Badding et al. |
| 2022/0209288 A1 | 6/2022 | Badding et al. |
| 2022/0209289 A1 | 6/2022 | Badding et al. |

FOREIGN PATENT DOCUMENTS

| | | |
|---|---|---|
| CN | 101786873 A | 7/2010 |
| CN | 102010183 A | 4/2011 |
| CN | 102280659 A | 12/2011 |
| CN | 103117413 A | 5/2013 |
| CN | 109378525 A | 2/2019 |
| EP | 2 037 527 A1 | 3/2009 |
| EP | 3599068 A1 | 1/2020 |
| EP | 3408246 B1 | 2/2020 |
| JP | H02-111658 A | 4/1990 |
| JP | H11-012041 | 1/1999 |
| JP | 2000-128629 | 5/2000 |
| JP | 2001-31476 A | 2/2001 |
| JP | 2004-63261 A | 2/2004 |
| JP | 2006-8488 A | 1/2006 |
| JP | 2009-203898 | 9/2009 |
| JP | 2010-102929 | 5/2010 |
| JP | 2010-176941 A1 | 8/2010 |
| JP | 2011/070939 A | 4/2011 |
| JP | 2012-031025 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 5273732 B2 | 8/2013 |
| JP | 5283188 B2 | 9/2013 |
| JP | 2013-214421 | 10/2013 |
| JP | 2014-2965 A | 1/2014 |
| JP | 2014-522331 | 9/2014 |
| JP | 2015-130481 A | 7/2015 |
| JP | 2015-215998 | 12/2015 |
| RU | 2483398 C1 | 5/2013 |
| WO | WO 81/02196 A1 | 8/1981 |
| WO | WO 2005/085138 A1 | 9/2005 |
| WO | WO 2009/038674 A2 | 3/2009 |
| WO | WO 2010/051345 A2 | 5/2010 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 A1 | 8/2017 |
| WO | WO 2017/197406 A1 | 11/2017 |
| WO | WO 2018/075972 A1 | 4/2018 |
| WO | WO 2018/118964 A1 | 6/2018 |
| WO | WO 2018/236394 A1 | 12/2018 |
| WO | WO 2019/090360 A1 | 5/2019 |
| WO | WO 2020/081718 A1 | 4/2020 |
| WO | WO 2020/236767 A1 | 11/2020 |
| WO | WO 2021/146633 A1 | 7/2021 |

OTHER PUBLICATIONS

Office Action of the JP Patent Application No. 2022-091043 dated May 16, 2023, and its English translation, 19 pages.
Rahaman, "Ceramic Processing", Kirk-Othmer Encyclopedia of Chemical Technololy, 2014; 98 pages.
Invitation to respond to written opinion for Singapore Patent Application No. 11202251298P dated Jan. 8, 2025.
Lu et al., "Electrochemical performance of LiCoO2 cathodes by surface modification using lanthanum aluminum garnet", Journal of Power Sources 184 (2008) 392-401; doi:10.1016/j.jpowsour.2008.04.087.

(56) References Cited

OTHER PUBLICATIONS

English translation of the First office Action of Chinese patent Application No. 202111593888.0 dated Oct. 31, 2022; 15 pages.

Extended European search report of EP application No. 21187050.6 dated Jan. 7, 2022; 12 pages.

Agrawal et al., "Solid polymer electrolytes: materials designing and all-solid-state battery applications: an overview", Journal of Physics D: Applied Physics 41, 2008, 223001, 18 pages.

Ahmad et al., "Concentration and mobility of mobile Li+ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142; DOI 10.1007/s10854-015-3473-6.

Ahmad, Mohamad, "Lithium ionic conduction and relaxation dynamics of spark plasma sintered $Li_5La_3Ta_2O_{12}$ garnet nanoceramics", Ahmad Nanoscale Research Letters, 2015, 10:58, DOI: 10.1186/s11671-015-0777-7, 10 pages.

Ahn et al., "Local impedance spectroscopic and microstructural analyses of Al-in-diffused $Li_7La_3Zr_2O_{12}$," Journal of Power Sources, 2014, vol. 254, pp. 287-292.

Allen et al., "Effect of substitution (Ta, Al, Ga) on the conductivity of $Li_7La_3Zr_2O_{12}$", issued on Journal of Power Sources 2012, vol. 206, pp. 315-319.

Arora et al., "Battery Separators", Chemical Reviews, 2004, vol. 104, pp. 4419-4462.

Baek et al., "Garnet related lithium ion conductor processed by spark plasma sintering for all solid state batteries," Journal of Power Sources, 2014, vol. 249, pp. 197-206.

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils," Journal of the American Ceramic Society, 2010, vol. 93, No. 11, pp. 3624-3631.

Bruce et al., "Li—$O_2$ and Li—S batteries with high energy storage", Nature Materials, Jan. 2012, vol. 11, pp. 19-29.

Buschmann et al. "Lithium metal electrode kinetics and ionic conductivity of the solid lithium ion conductors "$Li_7La_3Zr_2O_{12}$" and $Li_{7-x}La_3Zr_{2-x}Ta_xO_{12}$ with garnet-type strucutre," Journal of Power Sources, 2012, vol. 206, pp. 236-244.

Buschmann et al., "Structure and dynamics of the fast lithium ion conductor $Li_7La_3Zr_2O_{12}$", Phys. Chem. Chem. Phys., 2011, vol. 13, pp. 19378-19392.

Cao et al., "Effect of Sb-Ba codoping on the ionic conductivity of $Li_7La_3Zr_2O_{12}$ ceramic," Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes," ACS Appl. Mater. Interfaces, 2015, vol. 7, pp. 2073-2081.

Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

Cheng et al., "Measurement of the Sintering Pressure in Ceramic Films", J. Am. Ceram. Soc., 1988, vol. 71, No. 4, pp. 276-280.

Cheng J. et al., "On the green density sintering behavior and electrical property of tape cast $Ce_{0.9}Gd_{0.1}O_{1.95}$ electrolyte films", Materials Research Bulletin, Dec. 1, 2002, vol. 37, No. 15, pp. 2437-2446, XP004395782.

Cologna et al., "Effect of Al and Ce doping on the deformation upon sintering in sequential tape cast layers for solid oxide fuel cells", Journal of Power Sources, vol. 193, 2009, pp. 80-85.

Cologna et al., "Vertical sintering to measure the uniaxial viscosity of thin ceramic layers", Acta Materialia, vol. 58, 2010, pp. 5558-5564.

David et al., "Microstructure and Li-Ion Conductivity of Hot-Pressed Cubic $Li_7La_3Zr_2O_{12}$", J. Am. Cerami. Soc., 2015, pp. 1-6; DOI: 10.1111/jace.13455.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, vol. 6, pp. 17606-17615.

Dhivya et al., "Li+ transport properties of W substituted $Li_7La_3Zr_2O_{12}$ cubic lithium garnets," AIP Advances, 2013, vol. 3, pp. 082115.1-082115.21.

Djenadic, Ruzica et al., "Nebulized spray pyrolysis of Al-doped $Li_7La_3Zr_2O_{12}$ solid electrolyte for battery applications," Solid State Ionics, Oct. 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $L_7zLa_3Zr_2O_{12}$ Crystallizing with Cubic Symmetry," The Journal of Physical Chemistry, 2012, vol. 116, pp. 15192-15202.

English translation of the office action of Chinese application No. 201480055386.4 mailing date of Jan. 4, 2017; 9 pages.

Extended European Search Report dated Feb. 22, 2017 for European application No. 14864783.7; 9 pages.

Ferrese et al., "Lithium Redistribution in Lithium-Metal Batteries", Journal of The Electrochemical Society, 2012, vol. 159, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.

Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.

Geiger et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, Oct. 2, 2000, vol. 12, No. 19, pp. 1465-1469.

Gotschel et al., "Processing of preceramic paper and ceramic green tape derived multilayer structures", Advances in Applied Ceramics, vol. 112, No. 6, 2013, pp. 358-365.

Gu et al., "Effects of penta-and trivalent dopants on structures and conductivity $Li_7La_3Zr_2O_{12}$," Solid State Ionics, 2015, vol. 274, pp. 100-105.

Gurauskis et al., "Laser drilling of Ni—YSZ cermets", Journal of the European Ceramic Society, Oct. 1, 2008, vol. 28, No. 14, pp. 2671-2680, XP023610743.

(56) References Cited

OTHER PUBLICATIONS

Han et a., "Experimental visualization of lithium conduction pathways in garnet-type $Li_7La_3Zr_2O_{12}$", Chem. Commun., 2012, vol. 48, pp. 9840-9842.

Han et al., "Control of shrinkage on the behavior of co-firing of ferrite and varistor multi-layers composite with organic content", J Electroceram, 2009, vol. 23, pp. 559-563.

Hayashi et al., "New Phases in $La_2O_3$—$Li_2O$—$Ta_2O_5$ System", Mat. Res. Bull. 1986, vol. 21, No. 3, pp. 289-293.

Herrmann et al., "Micro-segregation in liquid phase sintered silicon carbide ceramics," Journal of the European Ceramic Society, Apr. 1, 2010, vol. 30, pp. 1495-1501.

Hitz et al., "Highly Li-Stuffed Garnet-Type $Li_{7+x}La_3Zr_{2-x}Y_xO_{12}$", Journal of The Electrochemical Society, 2013, vol. 160, No. 8, pp. A1248-A1255.

Hu et al., "Highly conductive paper for energy-storage devices", PNAS, Dec. 22, 2009, vol. 106, No. 51, pp. 21490-21494; www.pnas.org/cgi/doi/10.1073/pnas.090885810.

Hyooma et al., "Crystal Structures of $La_3Li_5M_2O_{12}$ (M=Nb, Ta)", Mat. Res. Bull. 1988, vol. 23, No. 10, pp. 1399-1407.

International Search Report and Written Opinion mailed Apr. 15, 2016 in PCT/US2016/015209, 13 pages.

International Search Report and Written Opinion mailed Dec. 1, 2016 in PCT/US2016/043428, 11 pages.

International Search Report and Written Opinion mailed Mar. 10, 2015 in PCT/US2014/059578, 16 pages.

International Search Report and Written Opinion mailed Mar. 23, 2015 in PCT/US2014/059575, 17 pages.

Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.

Jalem et al., "Effects of Gallium doping in Garnet-Type $L_7La_3Zr_2O_{12}$ Solid Electrolytes," Chemistry of Materials, 2015, vol. 27, pp. 2821-2831.

Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace. 13578.

Jin et al., "Al-doped $Li_7La_3Zr_2O_2$ synthesized by a polymerized complex method," Journal of Power Sources, 2011, vol. 196, pp. 8683-8687.

Jung et al., "Ceramic separators based on Lip-conducting inorganic electrolyte for high-performance lithium-ion batteries with enhanced safety," Journal of Power Sources, 2015, vol. 293, pp. 675-683.

Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.

Kato et al., "Preparation of thick-film electrode-solid electrolyte composites on $Li_7La_3Zr_2O_{12}$ and their electrochemical properties," Journal of Power Sources, 303, 2016, pp. 65-72.

Katsui et al., "Preparation of cubic and tetragonal $Li_7La_3Zr_2O_{12}$ flim by metal organic chemical vapor deposition," Thin Solid Films, vol. 584, Jun. 1, 2015, pp. 130-134.

KC et al., "Point defects in garnet-type solid electrolyte (c—$Li_7La_3Zr_2O_{12}$) for Li-ion batteries," Solid State Ionics, 2014, vol. 261, pp. 100-105.

Kerman et al. "Review—Practical Challenges Hindering the Development of Solid State Li Ion Batteries", Journal of the Electrochemical Society, 2017, vol. 164. No. 7, pp. A1731-A1744.

Kerman et al., "Complex oxide nanomembranes for energy conversion and storage: A review", Journal of Materials Research, vol. 29, No. 3, Feb. 14, 2014, pp. 320-337.

Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim et al., "Characterization of the interface between $LiCoO_2$ and $Li_7La_3Zr_2O_{12}$ in an all-solid-state rechargeable lithium battery," Journal of Power Sources, 2011, vol. 196, pp. 764-767.

Kim et al., "Epitaxial growth and lithium ion conductivity of lithium-oxide garnet for an all solid-state battery electrolytet", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, vol. 99, No. 4, pp. 1367-1374; DOI: 10.1111/jace.14084.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.

Kong et al., "Transparent Ceramics, Topics in Mining," Springer International Publishing Switzerland, 2015, Metallurgy and Materials Engineering, DOI 10.1007/978-3-319-18956-7_2; pp. 29-91.

Kotobuki et al., "Compatibility of $Li_7La_3Zr_2O_{12}$ Solid Electrolyte to All-Solid-State Battery Using Li Metal Anode", Journal of the Electrochemical Society, 2010, vol. 157, No. 10, pp. A1076-A1079.

Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.

Lai et al., "Ultrahigh-Energy-Density Microbatteries Enabled by New Electrode Architecture and Micropackaging Design," Adv. Mater., 2010, vol. 22, pp. E139-E144.

Lallemant et al., "Transparent polycrystalline alumina obtained by SPS: Green bodies processing effect," Journal of the European Ceramic Society, 2012, vol. 32, pp. 2909-2915.

Langer et al., "Syntheis of single phase cubic Al-substituted $Li_7La_3Zr_2O_{12}$ by solid state lithiation of mixed hydroxides," Journal of Alloys and Compounds, 2015, vol. 645, pp. 64-69.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

Lee et al., "High lithium ion conductivity of $Li_2La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.

Li et al., "The reaction of $Li_{6.5}La_3Zr_{1.5}Ta_{0.5}O_{12}$ with water," Solid State Ionics, 2015, vol. 269, pp. 57-61.

Li et al., "W-Doped $Li_7La_3Zr_2O_{12}$ Ceramic Electrolytes for Solid State Li-ion Batteries," Electrochimica Acta, 2015, vol. 180, pp. 37-42.

Liu et al., "High Ion Conductivity in Garnet-type F-doped $L_7La_3Zr_2O_{12}$," Journal of Inorganic Materials, Sep. 2015, vol. 30, No. 9, pp. 995-1001; DOI: 10.15541/jim20150163.

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.

Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.

Matsuda et al., "Phase formation of a garnet-type lithium-ion conductor $Li_{7-3x}Al_xLa_3Zr_2O_{12}$," Solid State Ionics, 2015, vol. 277, pp. 23-29.

(56) References Cited

OTHER PUBLICATIONS

Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.
Mccloskey et al., "On the Mechanism of Nonaqueous Li—$O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Minami et al., "Crystallization Process for Superionic $Li_7P_3S_{11}$ Glass-Ceramic Electrolytes", Journal of the American Ceramic Society, 2011, vol. 94, pp. 1779-1783.
Mitterdorfer et al., "Fabrication of thin electrolytes for second-generation solid oxide fuel cells," Solid State Ionics, 2000, vol. 131, pp. 79-96.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Muralidharan et al., "Optimization of process parameters for the production of Ni—Mn—Co—Fe based NTC chip thermistors through tape casting route", Journal of Alloys and Compounds, 2011, vol. 509, pp. 9363-9375.
Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \leq x \leq 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B= Sc or Zr)," Solid State Ionics, 2015, vol. 282, pp. 7-12.
Neudecker et al., "'Lithium-Free' Thin-Film Battery with In Situ Plated Li Anode," Journal of The Electrochemical Society, 2000, vol. 147, No. 2, pp. 517-523.
Ni et al., "Room temperature elastic moduli and Vickers hardness of hot-pressed LLZO cubic garnet," J. Mater. Sci., 2012, vol. 47, pp. 7978-7985.
Nyman et al., "Alternative Approach to Increasing Li Mobility in Li—La—Nb/Ta Garnet Electrolytes," Chem. Mater., 2010, vol. 22, No. 19, pp. 5401-5410.
English Translation of the Office Action of Chinese application No. 201480055387.9 mailing date of Dec. 22, 2016; 7 pages.
Office Action of Japanese application No. 2016-520586 mailing date of Nov. 28, 2017 together with English translation; 8 pages.
Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x}, Nb_x)O_{12}(X=0-2)$," Journal of Power Sources, 2011, vol. 196, pp. 3342-3345.
Ohta et al., "All-solid-state lithium ion battery using garnet-type oxide and $Li_3BO_3$ solid electrolytes fabricated by screen-printing," Journal of Power Sources, vol. 238, 2013, pp. 53-56.
Ohta et al., "Electrochemical performance of an all-solid-state lithium ion battery with garnet-type oxide electrolyte," Journal of Power Sources, vol. 202, 2012, pp. 332-335.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL, USA; 5 pages.
Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.
Park et al., "Effects of crystallinity and impurities on the electrical conductivity of Li—La—Zr—O thin films," Thin Solid Films, 2015, vol. 576, pp. 55-60.
Peng et al., "A Reversible and Higher-Rate Li—$O_2$ Battery", Science, Aug. 3, 2012, vol. 337, pp. 563-567.
Preliminary Rejection of Korean Patent Application No. 10-2021-7024341 dated Nov. 8, 2021 with the English translation; 15 pages.
Puech et al., "Elaboration and characterization of a free standing LiSICON membrane for aqueous lithiumeair battery," Journal of Power Sources, 2012, vol. 214, pp. 330-336.
Quartarone et al., "Electrolytes for solid-state lithium rechargeable batteries: recent advances and perspectives", Chemical Society Reviews, vol. 40, 2011, pp. 2525-2540.
Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.
Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.
Rangasamy et al., "A High Conducting Oxide—Sulfide Composite Lithium Superionic Conductor," J. Mater. Chem. A, published 2014, vol. 2, pp. 4111-4116.
Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.
Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.
Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.
Raskovalov et al, "Structure and transport properties of $L1_7La_3Zr_{2-0.75x}Al_xO_{12}$ supersonic solid electrolytes," Journal of Power Sources, 2013, vol. 238, pp. 48-52.
Rauscher et al. "Steel-sheet fabrication by tape casting, Low Temperature Cofired Ceramics LTCC View project Colloidal Processing View project", International Journal of Powder Metallurgy, vol. 44, No. 6, 2008, pp. 39-48.
Reed, James S., Principles of Ceramics Processing, 2nd Edition, John Wiley & Sons, Inc., New York, Jan. 1995, pp. 60-61.
Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.
Ren et al., "Direct observation of lithium dendrites inside garnet-type lithium-ion solid electrolyte," Electrochemistry Communications, 2015, vol. 57, pp. 27-30.
Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.
Reppert T. et al., "$Li_7La_3Zr_2D_{12}$ electrolyte for all-solid-state batteries", Future Energy, Oct. 17, 2014, URL:https://juser.fz-juelich.de/record/171892/files/FZJ-2014-05448.pdf [retrieved on Jun. 15, 2021].
Reppert T. et al., "Oxide-ceramic electrolyte layers for all-solid-state lithium batteries", Jan. 21, 2015, pp. 1-1, XP055814028,

(56) References Cited

OTHER PUBLICATIONS

Retrieved from the Internet: URL:https://juser.fz-juelich.de/record/188042/files/FZJ-2015-01520.pdf.
Rettenwander et al., "Site Occupation of Ga and Al in Stabilized Cubic $Li_{7-3(x+y)}Ga_xAl_yLa_3Zr_2O_{12}$ Garnets As Deduced from $^{27}Al$ and $^{71}Ga$ MAS NMR at Ultrahigh Magnetic Fields," Chemistry of Materials, 2015, vol. 27, pp. 3135-3142.
Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.
Rettenwander et al., "DFT study of the role of $Al^{3+}$ in the fast ion-conductor $Li_{7-3x\_L\ Al}{}^{3+}{}_xLa_3Zr_2O_{12}$ Garnet," Chem. Mater. 2014, vol. 26, pp. 2617-2623.
Rosero-Navarro et al., "Preparation of $Li_7La_3(Zr_{2\_x},Nb_x)O_{12}$ (x=0-1.5) and $Li_3BO_3/LiBO_2$ composites at low temperatures using a sol-gel process," Solid State Ionics, 2016, vol. 285, pp. 6-12.
Sakamoto et al., "Synthesis of nano-scale fast ion conducting cubic $Li_7La_3Zr_2O_{12}$", Nanotechnology, 2013, vol. 24, 424005, 8 pages.
Sakamoto, Jeff, "Garnet-based ceramic electrolyte: Enabling Li metal anodes and solid state batteries," Beyond Lithium Ion VI, Jun. 4-6, 2013, Boulder, CO., 36 pages.
Sakuda et al., "Evaluation of elastic modulus of $Li_2S—P_2S_5$ glassy solid electrolyte by ultrasonic sound velocity measurement and compression test", Journal of the Ceramic Society of Japan 121, 2013, pp. 946-949.
Schafbauer et al., "Tape Casting as a Multi Purpose Shaping Technology for Different Applications in Energy Issues", Materials Science Forum vols. 706-709, 2012, pp. 1035-1040.
Schmidt et al., "In-situ, non-destructive acoustic characterization of solid state electrolyte cells", Journal of Power Sources, 2016, vol. 324, pp. 126-133.
Second Office Action of Chinese Application No. 201480055386.4 mailing date of Nov. 1, 2017 together with English translation, 10 pages.
Sharafi et al., "Characterizing the $Li—Li_7La_3Zr_2O_{12}$ interface stability and kinetics as a function of temperature and current density," Journal of Power Sources, 2016, vol. 302, pp. 135-139.
Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.
Shin et al., "Synergistic multi-doping effects on the $Li_7La_3Zr_2O_{12}$ solid electrolyte for fast lithium ion conduction," Scientific Reports, 5:18053; DOI: 10.1038/srep18053, 2015, pp. 1-9.
Song et al., "Crystal structure, migration mechanism and electrochemical performance of Cr-stabilized garnet," 2014, vol. 268, pp. 135-139.
Suárez et al., "Sintering to Transparency of Polycrystalline Ceramic Materials", Mar. 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.
Sudo et al., "Interface behavior between garnet-type lithium-conducting solid electrolyte and lithium metal," Solid State Ionics, 2014, vol. 262, pp. 151-154.
Suzuki et al., "Transparent cubic garnet-type solid electrolyte of $Al_2O_3$-doped $Li_7La_3Zr_2O_{12}$," Solid State Ionics, 2015, vol. 278, pp. 172-176.
Tadanaga et al., "Low temperature synthesis of highly ion conductive $Li_7La_3Zr_2O_{12}—Li_3BO_3$ composites," Electrochemistry Communications, 2013, vol. 33, pp. 51-54.
Takada, "Progress and prospective of solid-state lithium batteries", Acta Materialia 61, 2013, pp. 759-770.
Takeda et al., "High Pressure Form of Fluoride Garnets $Na_3M_2Li_3F_{12}$ (M=& Fe)," Mat. Res. Bull., 1977, vol. 12, No. 7, pp. 689-692.
Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.
Thangadurai et al., "Fast Solid-State Li Ion Conducting Garnet-Type Structure Metal Oxides for Energy Storage," J. Phys. Chem. Lett., 2015, vol. 6, pp. 292-299.
Thangadurai et al., "$Li_6ALa_2N\ 0_{12}$ (A=Ca, Sr, Ba): A New Class of Fast Lithium Ion Conductors with Garnet-Like Structure," J. Am. Ceram. Soc., 2005, vol. 88, No. 2, pp. 411-418.
Thangadurai et al., "Novel Fast Lithium Ion Conduction in Garnet-Type $Li_5La_3M_2O12$ (M=NB, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.
Thompson et al., "A Tale of Two Sites: On Defining the Carrier Concentration in Garnet-Based Ionic Conductors for Advanced Li Batteries," Adv. Energy Mater., 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "The synergistic effects of al and Te on the structure and Li+-mobility of garnet-type solid electrolytes", J. Mater. Chem. A. 2014, vol. 2, pp. 20271-20279.
Wang et al., "A general method to synthesize and sinter bulk ceramics in seconds", Science 368, (2020) May 1, 2020, pp. 521-526.
Wang et al., "Transparent ceramics: Processing, materials and applications," Progress in Solid State Chemistry, 2013, vol. 41, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.
Wilkinson et al., "Effects of physical constraints on Li cycability," Journal of Power Sources, 1991, vol. 36, pp. 517-527.
Willmann et al., "Characteristics and evaluation criteria of substrate-based manufacturing. Is roll-to-roll the best solution for printed electronics?", Organic Electronics, 2014, vol. 15, pp. 1631-1640.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.
Xie et al., "Lithium Distribution in Aluminum-Free Cubic $Li_7La_3Zr_2O_{12}$", issued on Chem. Mater. 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires

(56) References Cited

OTHER PUBLICATIONS and Particle Size-Dependent Phase Transformation", J.Physical Chemistry C, 2015, vol. 119, pp. 14947-14953.

Yang et al., "Tape-casted transparent alumina ceramic wafers", J. Mater. Res., Oct. 14, 2014, vol. 29, No. 19, pp. 2312-2317.

Yi et al., "Key parameters governing the densification of cubic-$Li_7La_3Zr_2O_{12}$ Li+conductors", Journal Of Power Sources, Elsevier SA, CH, vol. 352, Mar. 31, 2017, pp. 156-164.

Yi et al., "Flame made nanoparticles permit processing of dense, flexible, Li+ conducting ceramic electrolyte thin films of cubic-$Li_7La_3Zr_2O_{12}$ (c-LLZO)", J. Mater. Chem. A, 2016, vol. 4, pp. 12947-12954.

Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.

Yu et al., "Experimental determination of the uniaxial viscosity of low-temperature co-fired ceramic tapes by vertical sintering", Ceramics International, 2014, vol. 40, pp. 9367-9375.

Zaiss et al., "Fast ionic conduction in cubic hafnium garnet $Li_7La_3Hf_2O_{12}$," Ionics, Springer-Verlag, 2010, vol. 16, pp. 855-858.

Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.

Zhang et al., "Field assisted sintering of dense Al-substituted cubic phase $Li_7La_3Zr_2O_{12}$ solid electrolytes", Journal of Power Sources, 2014, vol. 268, pp. 960-964.

Zhang et al., "Preparation of cubic $Li_7La_3Zr_2O_{12}$ solid electrolyte using a nano-sized core-shell structured precursor", Journal of Alloys and Compounds, 2015, vol. 644, pp. 793-798.

401

402

HIGH GREEN DENSITY CERAMICS FOR BATTERY

CROSS-REFERENCE TO RELATED APPLICATIONS

The application claims priority to, and the benefit of, U.S. Provisional Patent Application No. 62/961,611, filed Jan. 15, 2020, the entire contents of which are herein incorporated by reference in their entirety for all purposes.

FIELD

The present disclosure concerns precursors to inorganic green tapes with high density, processes for using these precursors to make the green tapes with high density, and processes for using the green tapes with high density to make sintered thin films

BACKGROUND

Solid state ceramics, such as lithium-stuffed garnet materials and lithium borohydrides, oxides, sulfides, oxyhalides, and halides have several advantages as materials for ion-conducting electrolyte membranes and separators in a variety of electrochemical devices including fuel cells and rechargeable batteries. When compared to their liquid-based counterparts, the aforementioned solid ceramics possess safety and economic advantages as well as advantages related to the material's solid state and density which allows for correspondingly high volumetric and gravimetric energy densities when these materials are incorporated into electrochemical devices as electrolyte separators. Solid state ion conducting ceramics are well suited for solid state electrochemical devices because of their high ion conductivity properties in the solid state, their electric insulating properties, as well as their chemical compatibility with a variety of electrode materials such as lithium metal and their stability to a wide window of voltages.

Although solid state ion conducting ceramics have a series of advantageous and beneficial properties, these materials suffer from a range of issues related to forming dense green films (i e., green tapes) and to subsequently sintering these green tapes. When solid state ion conducting ceramics are typically formulated as thin films and sintered, these films tend to stick to the substrate on which they are prepared, to crack or warp because of the processing conditions, or are too brittle post-sintering to handle and manipulate. During sintering of thin films, these films tend to crack, warp, or otherwise have surface deteriorations.

There is therefore a series of problems in the relevant field related to casting green tapes of ceramics, such as but not limited to garnets, and to sintering these green tapes to prepare high density garnet thin films What is needed in the relevant field is, for example, improved materials and processes for casting green tapes with high density.

SUMMARY

The instant disclosure sets forth such materials and processes, in addition to making and using the same, and other solutions to problems in the relevant field.

In one embodiment, a process for making a high density green tape is provided, the process comprising:
(a) providing a slurry comprising at least one source powder;
(b) mixing the slurry with a binder solution in a non-reactive environment;
(c) casting the slurry to form a green tape in a non-reactive environment; and
(d) drying the green tape in a non-reactive environment to achieve density >2.9 g/ml.

In certain embodiments, each non-reactive environment is unique with regard to temperature, pressure, or atmosphere composition. In certain embodiments, each non-reactive environment is the same non-reactive environment.

In some embodiments, the at least one source powder is calcined in a non-reactive environment to achieve density >4.7 g/ml as measured by geometric density. In some embodiments, the amount of the at least one source powder in the green tape is at least 50%, 55%, 55%, 60%, 65%, 70%, 80%, 85%, or 90% by weight. In some embodiments, the at least one source powder is selected from the group consisting of lithium-stuffed garnet, chemical precursors to lithium-stuffed garnet, and lithium-stuffed garnet with aluminum oxide dopants. In some embodiments, the lithium-stuffed garnet is a material selected from the group consisting of: $Li_A La_B M'_C M''_D Zr_E O_F$, wherein $4<A<8.5$, $1.5<B<4$, $0\le C\le 2$, $0\le D\le 2$; $0\le E<2.5$, $10<F\le 13.5$, and M' and M" are each, independently in each instance selected from Al, Mo, W, Nb, Sb, Ca, Ba, Sr, Ce, Hf, Rb, Ga, and Ta. In some embodiments, the particle size $d_{50}$ is about 100 nm-200 nm, about 200 nm-300 nm, about 300 nm-400 nm, about 400 nm-500 nm, about 500 nm-600 nm, about 600 nm-700 nm, about 700 nm-800 nm, about 800 nm-900 nm, about 900 nm-1 μm, about 1 μm-2 μm, or about 2 μm-3 μm.

In some embodiments, the process further comprises milling the at least one source powder in a non-reactive environment in an anhydrous aprotic solvent. In some embodiments, the non-reactive environment comprises nitrogen gas and humidity at about −10° C. to −20° C., at about −20° C. to −30° C., at about −30° C. to −40° C., at about −40° C. to −50° C., or at about −50° C. to −60° C. dew point. In some embodiments, the non-reactive environment comprises argon gas and humidity at about −10° C. to −20° C., at about −20° C. to −30° C., at about −30° C. to −40° C., at about −40° C. to −50° C., or at about −50° C. to −60° C. dew point. In some embodiments, the aprotic solvent is selected from the group consisting of: benzene, toluene, xylene, ethyl acetate, tetrahydrofuran, dioxane, and 1,2-dimethoxyethane. In some embodiments, milling is selected from the group consisting of dry milling, attrition milling, sonication milling, high energy milling, wet milling, jet milling, and cryogenic milling. In some embodiments, the source powder is milled until it has a particle size $d_{50}$ that is about 100 nm-200 nm, about 200 nm-300 nm, about 300 nm-400 nm, about 400 nm-500 nm, about 500 nm-600 nm, about 600 nm-700 nm, or about 700 nm-750 nm.

In some embodiments, prior to step (c) or step (d), the process includes mixing the slurry of the modified source powder in a non-reactive environment with a binder selected from the group consisting of polypropylene (PP), atactic polypropylene (aPP), isotactic polypropylene (iPP), other polyolefins such as ethylene propylene rubber (EPR), ethylene pentene copolymer (EPC), polyisobutylene (KB), styrene butadiene rubber (SBR), poly(ethylene-co-1-octene) (PE-co-PO), poly(ethylene-co-methylene cyclopentene) (PE-co-PMCP), stereoblock polypropylenes, polypropylene polymethyl pentene, polyethylene oxide (PEO), PEO block copolymers, silicone polymers and copolymers, polyvinyl butyral (PVB), poly(vinyl acetate) (PVAc), polyvinylpyrrolidine (PVP), poly(ethyl methacrylate) (PEMA), acrylic polymers (for example polyacrylates, polymethacrylates, and copolymers thereof), binders from the Paraloid family of resins, binders from the Butvar family of resins, binders from the Mowital family of resins, and combinations thereof. In some embodiments, milling the slurry of the modified source powder, with a dispersant selected from the group consisting of fish oil, fatty acids of degree $C_8$-$C_{20}$, alcohols of degree $C_8$-$C_{20}$, alkylamines of degree $C_8$-$C_{20}$, phosphate esters, phospholipids, olymeric dispersants such as poly(vinylpyridine), poly(ethylene imine), poly(ethylene oxide) and ethers thereof, poly(ethylene glycol) and ethers thereof, polyalkylene amine, polyacrylates, polymethacrylates, poly(vinyl alcohol), poly(vinyl acetate), polyvinyl butyral, maleic anhydride copolymers, glycolic acid ethoxylate lauryl ether, glycolic acid ethoxylate oleyl ether, sodium dodecyl sulfate, sodium dodecylbenzenesulfonate, cetyltrimethylammonium bromide, cetylpyridinium chloride, surfactants and dispersants from the Brij family of surfactants, the Triton family of surfactants, the Solsperse family of dispersants, the SMA family of dispersants, the Tween family of surfactants, and the Span family of surfactants. In some embodiments, the fatty acids of degree $C_8$-$C_{20}$ are at least one of dodecanoic acid, oleic acid, stearic acid, linolenic acid, and/or linoleic acid. As used herein, degree $C_8$-$C_{20}$ means that the described organic group includes 8 to 20 carbon atoms. In some embodiments, the alcohols of degree $C_8$-$C_{20}$ are at least one of dodecanol, oleyl alcohol, and/or stearyl alcohol. In some embodiments, the alkylamines of degree $C_8$-$C_{20}$ are at least one of dodecylamine, oleylamine, and/or stearylamine. In some embodiments, the phospholipids are phosphatidylcholine and/or lecithin. In some embodiments, the process further comprises, prior to step (c) or step (d), mixing the slurry of the source powder in a non-reactive environment with a plasticizer selected from dibutyl phthalate, dioctylphthalate, and benzyl butyl phthalate. In some embodiments, the filtration technique is selected from the group consisting of sieving, centrifugation, and separating particles of different size or different mass. In some embodiments, the slurry has a solid loading of 1 wt % to 99 wt % and wherein the solid loading refers to the amount of source powder. In some embodiments, the slurry when dried comprises the source powder at 80% wt/wt. In some embodiments, the slurry when dried comprises about 10-25% wt/wt organic content and wherein the organic content comprises slurry components other than the source powder. In some embodiments, the green tape has a density above 2.9 g/cm$^3$ as measured by geometric density. In some embodiments, the green tape is sintered.

In some examples, including any of the foregoing, the filtration technique occurs in a non-reactive environment. In some examples, including any of the foregoing filtering, the process includes filtering the slurry in a non-reactive environment.

Some embodiments provide a free-standing green tape comprising
a. lithium-stuffed garnet particles or particles of precursors to lithium-stuffed garnet; and
b. at least one element selected from a binder, a plasticizer, a dispersant, and a surfactant.

In some embodiments, the free-standing green tape has a density of 2.9-5.0 g/cm$^3$, a thickness of 0.5-100 μm, and a lateral extent of 0.5-400 cm$^2$. In some embodiments, the particles have a $d_{50}$ of about 0.1-0.2 μm, about 0.2-0.3 μm, about 0.3-0.4 μm, about 0.4-0.5 μm, about 0.5-0.6 μm, about 0.6-0.7 μm, about 0.7-0.8 μm, about 0.8-0.9 μm, about 0.9-1.0 μm, about 1.0-1.1 μm. In some embodiments, the free-standing green tape has a thickness between about 500 nm and about 100 μm. In some embodiments, green tape area is at least 0.5 cm$^2$. In some embodiments, green tape thickness varies by less than 5% over a 10 cm$^2$ area. In some embodiments, the green tape has a ceramic loading of about 50-80 vol %, a thickness of about 0.5-100 μm, and a lateral extent of about 0.5-400 cm$^2$. In some embodiments, the green tape has a ceramic loading of about 55-80 vol %, a thickness of about 0.5-100 μm, and a lateral extent of about 0.5-400 cm$^2$, a ceramic loading of about 55-75 vol %, a thickness of about 0.5-100 μm, and a lateral extent of about 0.5-400 cm$^2$, a ceramic loading of about 50-75 vol %, a thickness of about 0.5-100 μm, and a lateral extent of about 0.5-400 cm$^2$, a ceramic loading of about 55-70 vol %, a thickness of about 0.5-100 μm, and a lateral extent of about 0.5-400 cm$^2$, a ceramic loading of about 50-65 vol %, a thickness of about 0.5-100 μm, and a lateral extent of about 0.5-400 cm$^2$, or a ceramic loading of about 55-65 vol %, a thickness of about 0.5-100 μm, and a lateral extent of about 0.5-400 cm$^2$.

In some embodiments, including any of the foregoing, the green tape has a density of 2.9-5.0 g/cm$^3$, a thickness of 0.5-100 um, and a lateral extent of 0.5-400 cm$^2$. In some embodiments, the particles have a $d_{50}$ of about 0.1-about 0.2 μm. In some embodiments, the particles have a $d_{50}$ of 0.2-about 0.3 μm. In some embodiments, the particles have a $d_{50}$ of 0.3-about 0.4 μm. In some embodiments, the particles have a $d_{50}$ of 0.4-about 0.5 μm. In some embodiments, the particles have a $d_{50}$ of 0.5-about 0.6 μm. In some embodiments, the particles have a $d_{50}$ of 0.6-about 0.7 μm. In some embodiments, the particles have a $d_{50}$ of 0.7-about 0.8 μm. In some embodiments, the particles have a $d_{50}$ of 0.8-about 0.9 μm. In some embodiments, the particles have a $d_{50}$ of 0.9-about 1.0 μm. In some embodiments, the particles have a $d_{50}$ of or 1.0-about 1.1 μm. In some embodiments, the free-standing green tape has a thickness between about 500 nm and about 100 μm. In some embodiments, the green tape area is at least 0.5 cm$^2$. In some embodiments, the green tape thickness varies by less than 5% over a 10 cm$^2$ area. In some embodiments, the green tape has a source powder solid loading of about 50-about 80 vol %, a thickness of about 0.5-about 100 um, and a lateral extent of about 0.5-400 cm$^2$. In some embodiments, the green tape has a ceramic loading of about 55-about 80 vol %, a thickness of about 0.5-about 100 um, and a lateral extent of about 0.5-400 cm$^2$. In some embodiments, the green tape has a ceramic loading of about 55-about 75 vol %, a thickness of about 0.5-about 100 um, and a lateral extent of about 0.5-400 cm$^2$. In some embodiments, the green tape has a ceramic loading of about 50-about 75 vol %, a thickness of about 0.5-about 100 um, and a lateral extent of about 0.5-400 cm$^2$. In some embodiments, the green tape has a ceramic loading of about 55-about 70 vol %, a thickness of about 0.5-about 100 um, and a lateral extent of about 0.5-400 cm$^2$. In some embodiments, the green tape has a ceramic loading of about 50-about 65 vol %, a thickness of about 0.5-about 100 um, and a lateral extent of about 0.5-400 cm$^2$. In some embodiments, the green tape has a ceramic loading of about 55-about 65 vol %, a thickness of about 0.5-about 100 um, and a lateral extent of about 0.5-400 cm$^2$.

BRIEF DESCRIPTIONS OF THE DRAWINGS

Figure 1:
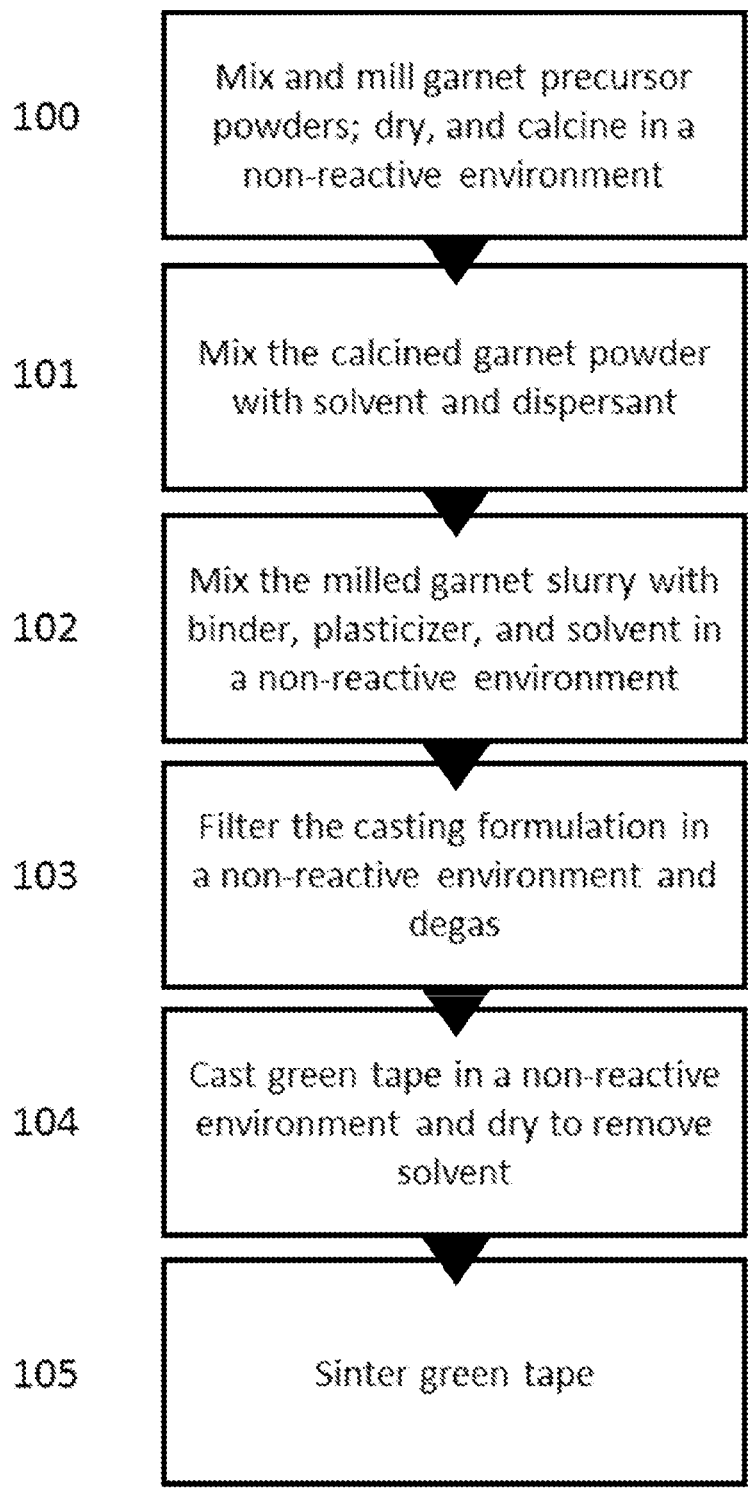
FIG. 1 shows an example flow chart in accordance with an embodiment of the process set forth herein.

The figures depict various embodiments of the present disclosure for purposes of illustration only. One skilled in the art will readily recognize from the following discussion that alternative embodiments of the structures and processes illustrated herein may be employed without departing from the principles described herein.

DETAILED DESCRIPTION

The following description is presented to enable one of ordinary skill in the art to make and use the disclosed subject matter and to incorporate it in the context of applications. Various modifications, as well as a variety of uses in different applications, will be readily apparent to those skilled in the art, and the general principles defined herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

The disclosure herein sets forth green tapes of high density prepared in a non-reactive environment, processes for making these green tapes, and processes for sintering these green tapes. The processes herein produce thin green tapes having high density when compared with green tapes prepared by conventionally known processes. Sintered films made from the green tapes have a surface which is suitable for incorporation into an electrochemical device without further processing, such as polishing or lapping. These green tapes shrink less when sintered compared to conventionally known processes. These green tapes do not warp or crack during sintering compared to conventionally known processes. These green tapes are suitable for electrochemical device applications.

A. DEFINITIONS

As used herein, "providing" refers to the provision of, generation of, presentation of, or delivery of that which is provided. Providing includes making something available. For example, providing a powder refers to the process of making the powder available, or delivering the powder, such that the powder can be used as set forth in a process described herein. As used herein, providing also means measuring, weighing, transferring combining, or formulating.

As used herein, "casting" means to provide, deposit, or deliver a cast solution or slurry onto a substrate. Casting includes, but is not limited to, slot casting, screen printing, gravure coating, dip coating, and doctor blading.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 µm.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein, "casting a slurry" refers to a process wherein a slurry is deposited onto, or adhered to, a substrate. Casting can include, but is not limited to, slot casting and dip casting. As used herein, casting also includes depositing, coating, or spreading a cast solution or cast slurry onto a substrate.

As used herein, "aluminum oxide dopants" means that the lithium-stuffed garnet includes an amount of aluminum or alumina such that the empirical formula for the lithium-stuffed garnet may be written to include, for example, an amount of $Al_2O_3$ in addition to an amount of $Li_7Zr_2La_3O_{12}$, e.g., $Li_7Zr_2La_3O_{12} \cdot Al_2O_3$.

As used herein the phrase "casting a film" or "casting a green tape" refers to the process of delivering or transferring a liquid or a slurry into a mold, or onto a substrate, such that the liquid or the slurry forms, or is formed into, a green tape. Casting may be done via doctor blade, Meyer rod, comma coater, gravure coater, microgravure, reverse comma coater, slot dye, slip and/or tape casting, and other processes known to those skilled in the art.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres or physically maintains the contact between the layers which are laminated. Laminating also refers to the process of bringing together unsintered, i.e. "green" ceramic films, potentially while under pressure and/or heating to join the films As used herein, the phrase "green tape" or "green film" refers to an unsintered tape or film including at least one member selected from garnet materials, precursors to garnet materials, binder, plasticizer, carbon, dispersant, or combinations thereof.

As used herein, the phrase "non-reactive environment" is either an environment which is at an ambient atmosphere (e.g., air or dried air) at temperature less than 30° C. and with a dew point below −40° C., or a non-reactive environment is an environment which is supplied with argon gas at temperature less than 30° C. and with a dew point below −40° C., unless stated otherwise to the contrary. Unless specified otherwise, a "non-reactive environment" is an ambient atmosphere (e.g., air or dried air) at temperature less than 30° C. and with a dew point below −10° C. and at 1 atm.

A "non-reactive environment" may also include an environment in which the ambient atmosphere is at a temperature less than 100° C. and with a dew point below −10° C.; or an environment with argon gas or nitrogen gas, or a combination thereof, at a temperature less than 100° C. and with a dew point below −10° C. A non-reactive environment has a pressure of 1 atm unless specified otherwise to the contrary. Examples include a dry room, such as the commercial dry room sold by Scientific Climate Systems. Other examples include a glove box, such as that sold by MBraun.

As used herein, the phrase "thickness" or "film thickness" or "green tape thickness" refers to the distance, or median measured distance between the top and bottom faces of a green tape. As used herein, the top and bottom faces refer to the sides of the green tape having the largest surface area.

As used herein, "thin" means, when qualifying a green tape, membrane, or the like, a thickness dimension less than 200 µm, sometimes less than 100 µm and in some cases between 0.1 and 60 µm.

As used herein, the phrases "garnet precursor chemicals," "chemical precursor to a Garnet-type electrolyte," or "garnet chemical precursors" refer to chemicals which react to form a lithium-stuffed garnet material described herein. These chemical precursors include, but are not limited to, lithium hydroxide (e.g., LiOH), lithium oxide (e.g., $Li_2O$), lithium carbonate (e.g., $Li_2CO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, corundum, aluminum (oxy) hydroxide (gibbsite and boehmite), gallium oxide, niobium oxide (e.g., $Nb_2O_5$), and tantalum oxide (e.g., $Ta_2O_5$).

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$). Molar ratios are as batched unless indicated expressly to the contrary.

As used herein, the phrase "as batched," refers to the respective molar amounts of components as initially mixed or provided at the beginning of a synthesis. For example, the formula $Li_7La_3Zr_2O_{12}$, as batched, means that the ratio of Li to La to Zr to O in the reagents used to make $Li_7La_3Zr_2O_{12}$ was 7 to 3 to 2 to 12.

As used herein, the phrase "characterized by the formula," refers to a molar ratio of constituent atoms either as batched during the process for making that characterized material or as empirically determined.

As used herein the term "solvent," refers to a liquid that is suitable for dissolving or solvating a component or material described herein. For example, a solvent includes a liquid, e.g., toluene, which is suitable for dissolving a component, e.g., the binder, used in the garnet sintering process.

As used herein, the term "anhydrous" refers to a substance containing less than 20 ppm water.

As used herein, the term "aprotic solvent" refers to a liquid comprising solvent molecules that do not include a labile or dissociable proton, hydronium, or hydroxyl species. An aprotic solvent molecule does not include a hydroxyl group or an amine group.

As used herein the phrase "removing a solvent," refers to the process whereby a solvent is extracted or separated from the components or materials set forth herein. Removing a solvent includes, but is not limited to, evaporating a solvent. Removing a solvent includes, but is not limited to, using elevated temperature, a vacuum or a reduced pressure to drive off a solvent from a mixture, e.g., an unsintered green tape. In some examples, a film that includes a binder and a solvent is heated or also optionally placed in a vacuum or reduced atmosphere environment to evaporate the solvent to leave the binder, which was solvated, in the thin film after the solvent is removed.

As used herein, "green film tape" refers to a roll, continuous layer, or cut portion thereof of casted tape, either dry or not dry, which can be sintered.

As used herein, a "binder" refers to a material that assists in the adhesion of another material. For example, as used herein, polyvinyl butyral is a binder because it is useful for adhering garnet materials. Other binders may include polycarbonates. Other binders may include polyacrylates and polymethacrylates. These examples of binders are not limiting as to the entire scope of binders contemplated here but merely serve as examples. Binders useful in the present disclosure include, but are not limited to, polypropylene (PP), atactic polypropylene (aPP), isotactic polypropylene (iPP), ethylene propylene rubber (EPR), ethylene pentene copolymer (EPC), polyisobutylene (PM), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (and other acrylics), acrylic, polyvinylacetacetal resin, polyvinyl butyral resin, PVB, polyvinyl acetal resin, stereoblock polypropylenes, polypropylene polymethylpentene copolymer, polyethylene oxide (PEO), PEO block copolymers, silicone, and the like.

As used here, the phrase "lithium-stuffed garnet electrolyte," refers to oxides that are characterized by a crystal structure related to a garnet crystal structure. Lithium-stuffed garnets include compounds having the formula $Li_4Li_{aB}M'_CM''_DZr_EO_F$, $Li_4La_BM'_CM''_DTa_EO_F$, or $Li_4La_BM'_CM''_DNb_EO_F$, wherein $4<A<8.5$, $1.5<B<4$, $0 \leq C \leq 2$, $0 \leq D \leq 2$; $0 \leq E < 2$, $10 < F < 13$, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c\leq2.5$; $0\leq d<2$; $0\leq e<2$, $10<f<13$ and Me" is a metal selected from Nb, Ta, V, W, Mo, Ga, or Sb and as described herein. Garnets, as used herein, also include those garnets described above that are doped with $Al_2O_3$. Garnets, as used herein, also include those garnets described above that are doped so that $Al^{3+}$ substitutes for $Li^+$ As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=subscript 2) so that the La: (Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 6-7 and y is 1.0. In some examples x is 7 and y is 0.35. In some examples x is 6-7 and y is 0.7. In some examples x is 6-7 and y is 0.4. Also, garnets as used herein include, but are not limited to, $Li_xLa_3Zr_2O_{12}+yAl_2O_3$. Non-limiting example lithium-stuffed garnet electrolytes are found, for example, in US Patent Application Publication No. 2015-0200420 A1, which published Jul. 16, 2015.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovitegrossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein the phrase "garnet-type electrolyte," refers to an electrolyte that includes a lithium-stuffed garnet material described herein as the ionic conductor. The advantages of Li-stuffed, garnet solid state electrolytes are many, including as a substitution for liquid, flammable electrolytes commonly used in lithium rechargeable batteries.

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ includes the characteristic dimension at which 50% of the particles are smaller than the recited size. $D_{50}$ herein is calculated on a volume basis, not on a number basis.

As used herein, a particle size distribution "PSD" is measured by light scattering, for example, using on a Horiba LA-950 V2 particle size analyzer in which the solvents used for the analysis include toluene, IPA, or acetonitrile and the analysis includes a one-minute sonication before measurement.

As used herein, the phrase "$d_{90}$ diameter" refers to the $90^{th}$ percentile size, in a distribution of sizes, measured by microscopy techniques or other particle size analysis techniques, such as, but not limited to, scanning electron microscopy or dynamic light scattering. $D_{90}$ includes the characteristic dimension at which 90% of the particles are smaller than the recited size. $D_{90}$ here is calculated on a volume basis, not on a number basis.

As used herein, the term "calcining" refers to processes involving chemical decomposition reactions or chemical reactions between solids (see Ceramic Processing and Sintering, Second Edition, M. N. Rahaman, 2005). Calcining is a different process from sintering, as used herein. Sintering involves densification and does not strive to achieve a desired phase for the material but, rather, a stable mechanical body. Sintering requires a high starting density and is typically done at higher temperatures, so-called firing temperatures. Calcining involves chemical decomposition reactions or chemical reactions between solids and not a reduction in surface free energy of consolidated particles.

As used herein the phrase "sintering the green tape," "sintering," or "sintering the film," refers to a process whereby a thin green tape, as described herein, is densified (made denser, or made with a reduced porosity) through the use of heat sintering or field assisted sintering. Sintering includes the process of forming a solid mass of material by heat and/or pressure without melting it to the point of complete liquification. Sintering produces a reduction in surface free energy of consolidated particles, which can be accomplished by an atomic diffusion process that leads to densification of the body, by transporting matter from inside grains into pores or by coarsening of the microstructure, or by rearrangement of matter between different parts of pore surfaces without actually leading to a decrease in pore volumes (see Rahaman at 32).

As used herein, the term "plasticizer" refers to an additive that imparts either flexibility or plasticity to the green tape. It may be a substance or material used to increase the binder's flexibility, workability, or distensibility. Flexibility is the ability to bend without breaking. Plasticity is the ability to permanently deform.

As used herein, the phrase "stress relieving," refers to a process which eliminates residual stress in a casted green tape during drying and associated shrinkage. One process of stress relieving includes heating the green tape at a temperature above the glass transition temperature of the organic components in the green tape to allow structural and stress rearrangement in the casted green tape to eliminate residual stress. Another process of stress relieving includes heating a casted green tape to 70° C. and holding at that temperature for a minute to allow casted green tape to relieve stress.

As used herein, a "geometric density" is calculated by dividing the mass of the green tape by its volume. The volume of the green tape is obtained from thickness and diameter measurements of the tape; or thickness, width, and length measurements. A micrometer may be used to measure thickness, while the diameter is obtained using optical microscopy. Density herein is geometric density unless expressly stated otherwise or to the contrary.

As used herein, a "pycnometry density" is measured using a Micromeritics AccuPycII 1340 Calibrate instrument. Using this instrument, a controlled amount of a powder sample is placed in a cup and its mass measured. The instrument is used to measure volume and calculate density by mass/volume.

As used herein, a green tape is considered to have high density if its density is above 2.9 g/ml.

As used herein, a green tape is considered to have low density if its density is at or below 2.6 g/ml.

As used herein, downsized garnet powder is considered to have high density if its density is above 4 g/ml.

As used herein, downsized garnet powder is considered to have low density if its density is at or below 3.6 g/ml.

As used herein, the phrase "sintering aid," refers to an additive that is used to either lower the melting point of a liquid phase or that allows for faster sintering than otherwise would be possible without the sintering add. Sintering aids assist in the diffusion/kinetics of atoms being sintered. For example, $Li_3BO_3$ may be used as an additive in sintering to provides for faster or more complete densification of garnet during sintering.

As used herein, the phrase "source powder" refers to an inorganic material used in a slurry set forth herein. In some examples, the source powder is a lithium-stuffed garnet. For example, the source powder may include a powder of $Li_7La_3Zr_2O_{12}.0.5Al_2O_3$.

As used herein, the term "DBP" refers to the chemical having the formula $C_{16}H_{22}O_4$, dibutyl phthalate, having a molecular weight of 278.35 g/mol.

As used herein, the term "BBP," refers to benzyl butyl phthalate, $C_{19}H_{20}O_4$, and having a molecular weight of 312.37 g/mol.

As used herein, the term "PEG," refers to polyethylene glycol. Unless otherwise specified, the molecular weight of the PEG is from 400 to 6000 g/mol.

B. GREEN TAPES

In some embodiments, the instant specification provides for improved materials and processes for casting green tapes with high density in a dry environment, which prevents the formation of low density phases such as lithium carbonates prior to the sintering step. Low density phases may be responsible for low density of ceramics, sticking and warping during sintering, and poor lithium ion conductivity of materials.

In one embodiment, the instant disclosure sets forth processes for casting a green tape, in which the processes include, generally, providing at least one source powder, calcining the powder in a non-reactive environment, milling the at least one calcined powder to prepare a slurry with aprotic solvent and a dispersant in a non-reactive environment, mixing the slurry with a binder solution in a non-reactive environment, casting the slurry to form a green tape in a non-reactive environment, drying the green tape in a non-reactive environment to achieve a high density green tape, and sintering the green tape to form a sintered thin film. In some embodiments, the process further comprises filtering the slurry in a non-reactive environment.

In a second embodiment, the instant disclosure sets forth a slurry for casting a green tape, in which the slurry includes a source powder, optionally precursors to the source powder, and at least one member selected from binders, dispersants, and solvents.

In a third embodiment, the instant disclosure sets forth a slurry for preparing a green tape, the slurry including a solvent, a source powder, and:
- at least: an aprotic, anhydrous solvent selected from the group consisting of benzene, toluene, xylene, ethyl acetate, tetrahydrofuran, dioxane, and 1,2-dimethoxyethane, and;
- a binder selected from the group consisting of polypropylene (PP), atactic polypropylene (aPP), isotactic polypropylene (iPP), other polyolefins such as ethylene propylene rubber (EPR), ethylene pentene copolymer (EPC), polyisobutylene (KB), styrene butadiene rubber (SBR), poly(ethylene-co-1-octene) (PE-co-PO), poly(ethylene-co-methylene cyclopentene) (PE-co-PMCP), stereoblock polypropylenes, polypropylene polymethyl pentene, polyethylene oxide (PEO), PEO block copolymers, silicone polymers and copolymers, polyvinyl butyral (PVB), poly(vinyl acetate) (PVAc), polyvinylpyrrolidine (PVP), poly(ethyl methacrylate) (PEMA), acrylic polymers (for example polyacrylates, polymethacrylates, and copolymers thereof), binders from the Paraloid family of resins, binders from the Butvar family of resins, binders from the Mowital family of resins; a dispersant selected from the group consisting of fish oil, fatty acids of degree C8-C20 (for example, dodecanoic acid, oleic acid, stearic acid, linolenic acid, linoleic acid), alcohols of degree C8-C20 (for example, dodecanol, oleyl alcohol, stearyl alcohol), alkylamines of degree C8-C20 (for example, dodecylamine, oleylamine, stearylamine), phosphate esters, phospholipids (for example, phosphatidylcholine, lecithin), polymeric dispersants such as poly(vinylpyridine), poly(ethylene imine), poly(ethylene oxide) and ethers thereof, poly(ethylene glycol) and ethers thereof, polyalkylene amine, polyacrylates, polymethacrylates, poly(vinyl alcohol), poly(vinyl acetate), polyvinyl butyral, maleic anhydride copolymers, glycolic acid ethoxylate lauryl ether, glycolic acid ethoxylate oleyl ether, sodium dodecyl sulfate, sodium dodecylbenzenesulfonate, cetyltrimethylammonium bromide, cetylpyridinium chloride, surfactants and dispersants from the Brij family of surfactants, the Triton family of surfactants, the Solsperse family of dispersants, the SMA family of dispersants, the Tween family of surfactants, the Span family of surfactants; a plasticizer selected from the group consisting of dibutyl phthalate, dioctyl phthalate, or benzyl butyl phthalate; a source powder selected from a lithium-stuffed garnet; or a combination thereof.

In a fourth embodiment, the instant disclosure sets forth a green tape, including: a source garnet powder; a plasticizer; a binder; and a dispersant; wherein the green tape has a geometric density greater than 2.9 g/ml.

In some examples set forth herein, the green tapes cast by the processes set forth herein are high in density. These green tapes are cast from slurries made with downsized ceramic materials. They may contain refractory and/or ceramic materials that are formulated as ceramic particles intimately mixed with a binder. The purpose of this binder is, in part, to assist the sintering of the ceramic particles to result in a uniform and thin film, or layer, of refractory or ceramic post-sintering. During the sintering process, a de-bindering step removes the binder from the green tape. In some examples, this de-bindering occurs at a temperature less than 700° C., less than 450° C., less than 400° C., less than 350° C., less than 300° C., less than 250° C., or in some examples less than 200° C., or in some examples less than 150° C., or in some examples less than 100° C. During the de-bindering process, the oxygen and water partial pressures may be controlled. The de-bindering process may include multiple stages.

C. PROCESS OF MAKING THE GREEN TAPE

The green tape set forth herein can be made by a variety of processes. In some processes a slurry containing a calcined source powder is prepared in a non-reactive environment using anhydrous aprotic solvents; this slurry is cast onto a substrate or a setter plate, and then this slurry is dried and sintered to prepare a dried and sintered solid ion conducting ceramic. In certain examples, the substrate may include, for example, Mylar, silicone coated Mylar, surfaces coated with polymers, surface modified polymers, or surface assembled monolayers adhered, attached, or bonded to a surface.

In one example, the processes set forth herein are substantially as set forth in FIG. 1. In this process, the first step 100 includes mixing, milling, drying and calcining garnet precursors. The next step 101 entails combining a solvent, dispersant, and a source powder such as garnet into a vessel in a non-reactive environment Milling media is also added. In step 102, the combined contents are milled for 1 hour to 3 days. In the fourth step 103, a binder solution is added to the milled mixture in a non-reactive environment and mixed, and the resulting slurry is then de-aired by a de-airing process to remove gas in a non-reactive environment. In the fifth step 104, the slurry is cast by a doctor blade cast process onto a substrate (e.g., silicone coated Mylar) and dried in a non-reactive environment. In the sixth step 105, the cast green tape is sintered. Variations on this process are also considered. In one example, the slurry is filtered before casting. In one example, the casting is done with slot die, screen printing, gravure, or other casting processes.

In some examples, the green tape density as measured by Archimedes process is greater than 2.5 g/cm$^3$. In some examples, the green tape density as measured by Archimedes process is greater than 2.6 g/cm$^3$. In some examples, the green tape density as measured by Archimedes process is greater than 2.7 g/cm$^3$. In some examples, the green tape density as measured by Archimedes process is greater than 2.8 g/cm$^3$. In some examples, the green tape density as measured by Archimedes process is greater than 2.9 g/cm$^3$. In some examples, the green tape density as measured by Archimedes process is greater than 3.0 g/cm$^3$. In some examples, the green tape density as measured by Archimedes process is greater than 3.1 g/cm$^3$. In some examples, the green density as measured by the geometric process is greater than 2.5 g/cm$^3$.

In some examples, the green tape geometric density is greater than 2.3 g/cm$^3$. In some examples, the green tape geometric density is greater than 2.4 g/cm³. In some examples, the green tape geometric density is greater than 2.5 g/cm³. In some examples, the green tape geometric density is greater than 2.6 g/cm³. In some examples, the green tape geometric density is greater than 2.7 g/cm³. In some examples, the green tape geometric density is greater than 2.8 g/cm³. In some examples, the green tape density as measured the geometric process is greater than 2.9 g/cm³. In some examples, the green tape geometric density is greater than 3.0 g/cm³. In some examples, the green tape geometric density is greater than 3.1 g/cm³.

In some examples, the green tape density as measured by Archimedes process is between 2.5 g/cm³ and 3.2 g/cm³. In some examples, the green tape density as measured by Archimedes process is between 2.6 g/cm³ and 3.2 g/cm³. In some examples, the green tape density as measured by Archimedes process is between 2.7 g/cm³ and 3.2 g/cm³. In some examples, the green tape density as measured by Archimedes process is between 2.8 g/cm³ and 3.2 g/cm³. In some examples, the green tape density as measured by Archimedes process is between 2.9 g/cm³ and 3.2 g/cm³. In some examples, the green tape density as measured by Archimedes process is between 3.0 g/cm³ and 3.2 g/cm³. In some examples, the green tape density as measured by Archimedes process is between 3.1 g/cm³ and 3.2 g/cm³.

In some examples, the green density as measured by the geometric process is between 2.5 g/cm³ and 3.2 g/cm³. In some examples, the green tape geometric density is between 2.6 g/cm³ and 3.2 g/cm³. In some examples, the green tape geometric density is between 2.7 g/cm³ and 3.2 g/cm³. In some examples, the green tape geometric density is between 2.8 g/cm³ and 3.2 g/cm³. In some examples, the green tape density as measured the geometric process is between 2.9 g/cm³ and 3.2 g/cm³. In some examples, the green tape geometric density is between 3.0 g/cm³ and 3.2 g/cm³. In some examples, the green tape geometric density is between 3.1 g/cm³ and 3.2 g/cm³.

In some embodiments, the ceramic loading (i.e., the amount of solid ceramic or source powder present in the green tape) of the green tape is greater than a certain percentage by volume after drying. In some examples, the ceramic loading of the green tape is greater than 40 vol %. In some examples, the ceramic loading of the green tape is greater than 50 vol %. In some examples, the ceramic loading of the green tape is greater than 55 vol %. In some examples, the ceramic loading of the green tape is greater than 60 vol %. In some examples, the ceramic loading of the green tape is greater than 61 vol %. In some examples, the ceramic loading of the green tape is greater than 62 vol %. In some examples, the ceramic loading of the green tape is greater than 63 vol %. In some examples, the ceramic loading of the green tape is greater than 64 vol %. In some examples, the ceramic loading of the green tape is greater than 65 vol %. In some examples, the ceramic loading of the green tape is greater than 66 vol %. In some examples, the ceramic loading of the green tape is greater than 67 vol %. In some examples, the ceramic loading of the green tape is greater than 68 vol %. In some examples, the ceramic loading of the green tape is greater than 69 vol %. In some examples, the ceramic loading of the green tape is greater than 70 vol %. In some examples, the ceramic loading of the green tape is greater than 71 vol %. In some examples, the ceramic loading of the green tape is greater than 72 vol %. In some examples, the ceramic loading of the green tape is greater than 73 vol %. In some examples, the ceramic loading of the green tape is greater than 74 vol %. In some examples, the ceramic loading of the green tape is greater than 75 vol %. In some examples, the ceramic loading of the green tape is greater than 76 vol %. In some examples, the ceramic loading of the green tape is greater than 77 vol %. In some examples, the ceramic loading of the green tape is greater than 78 vol %. In some examples, the ceramic loading of the green tape is greater than 79 vol %. In some examples, the ceramic loading of the green tape is greater than 80 vol %.

In some examples, the ceramic loading of the green tape is between 50 vol % and 80 vol %. In some examples, the ceramic loading of the green tape is between 55 vol % and 80 vol %. In some examples, the ceramic loading of the green tape is between 60 vol % and 80 vol %. In some examples, the ceramic loading of the green tape is between 61 vol % and 80 vol %. In some examples, the ceramic loading of the green tape is between 62 vol % and 80 vol %. In some examples, the ceramic loading of the green tape is between 63 vol % and 80 vol %. In some examples, the ceramic loading of the green tape is between 64 vol % and 80 vol %. In some examples, the ceramic loading of the green tape is between 65 vol % and 80 vol %. In some examples, the ceramic loading of the green tape is between 66 vol % and 80 vol %. In some examples, the ceramic loading of the green tape is between 67 vol % and 80 vol %. In some examples, the ceramic loading of the green tape is between 68 vol % and 80 vol %. In some examples, the ceramic loading of the green tape is between 69 vol % and 80 vol %. In some examples, the ceramic loading of the green tape is between 70 vol % and 80 vol %. In some examples, the ceramic loading of the green tape is between 71 vol % and 80 vol %. In some examples, the ceramic loading of the green tape is between 72 vol % and 80 vol %. In some examples, the ceramic loading of the green tape is between 73 vol % and 80 vol %. In some examples, the ceramic loading of the green tape is between 74 vol % and 80 vol %. In some examples, the ceramic loading of the green tape is between 75 vol % and 80 vol %. In some examples, the ceramic loading of the green tape is between 76 vol % and 80 vol %. In some examples, the ceramic loading of the green tape is between 77 vol % and 80 vol %. In some examples, the ceramic loading of the green tape is between 78 vol % and 80 vol %. In some examples, the ceramic loading of the green tape is between 79 vol % and 80 vol %. In some examples, the ceramic loading of the green tape is between 80 vol % and 81 vol %.

D. MILLING

In some embodiments, the processes herein include process steps related to mixing and, or, process steps related to milling. Milling includes ball milling Milling also includes milling processes that use anhydrous solvents under non-reactive conditions such as, for example but not limited to, benzene, toluene, xylene, ethyl acetate, tetrahydrofuran, dioxane, and 1,2-dimethoxyethane, or combinations thereof.

In some examples, the milling is ball milling In some examples, the milling is horizontal milling. In some examples, the milling is attritor milling. In some examples, the milling is immersion milling. In some examples, the milling is jet milling In some examples, the milling is steam jet milling. In some examples, the milling is high energy milling.

In some examples, the high energy milling process results in a milled particle size distribution with $d_{50}$ of approximately 100 nm as measured by light scattering. In some examples, the high energy milling process is used to achieve a particle size distribution with $d_{50}$ of about 750 nm as measured by light scattering. In some examples, the high energy milling process is used to achieve a particle size distribution with $d_{50}$ of about 150 nm as measured by light scattering. In some examples, the high energy milling process is used to achieve a particle size distribution with $d_{50}$ of about 200 nm as measured by light scattering. In some examples, the high energy milling process is used to achieve a particle size distribution with $d_{50}$ of about 250 nm as measured by light scattering. In some examples, the high energy milling process is used to achieve a particle size distribution with $d_{50}$ of about 300 nm as measured by light scattering. In some examples, the high energy milling process is used to achieve a particle size distribution with $d_{50}$ of about 350 nm as measured by light scattering. In some examples, the high energy milling process is used to achieve a particle size distribution with $d_{50}$ of about 400 nm as measured by light scattering. In some examples, the high energy milling process is used to achieve a particle size distribution with $d_{50}$ of about 450 nm as measured by light scattering. In some examples, the high energy milling process is used to achieve a particle size distribution with $d_{50}$ of about 500 nm as measured by light scattering. In some examples, the high energy milling process is used to achieve a particle size distribution with $d_{50}$ of about 550 nm as measured by light scattering. In some examples, the high energy milling process is used to achieve a particle size distribution with $d_{50}$ of about 600 nm as measured by light scattering. In some examples, the high energy milling process is used to achieve a particle size distribution with $d_{50}$ of about 650 nm as measured by light scattering. In some examples, the high energy milling process is used to achieve a particle size distribution with $d_{50}$ of about 700 nm as measured by light scattering. In some examples, the high energy milling process is used to achieve a particle size distribution with $d_{50}$ of about 800 nm as measured by light scattering. In some examples, the high energy milling process is used to achieve a particle size distribution with $d_{50}$ of about 850 nm as measured by light scattering. In some examples, the high energy milling process is used to achieve a particle size distribution with $d_{50}$ of about 900 nm as measured by light scattering. In some examples, the high energy milling process is used to achieve a particle size distribution with $d_{50}$ of about 950 nm as measured by light scattering. In some examples, the high energy milling process is used to achieve a particle size distribution with $d_{50}$ of about 1000 nm as measured by light scattering.

In some examples, the aprotic solvent is tetrahydrofuran. In another example, the aprotic solvent is 1,2-dimethoxyethane. In another example, the solvent is toluene. In another example, the solvent is benzene. In another example, the solvent is xylene. In another example, the solvent is dioxane. In yet another example, the solvent is dimethyl sulfoxide. In another example, the solvent is methylene chloride. In another example, the solvent is benzene. In another example, the solvent is N-methly-2-pyrrolidone. In another example, the solvent is dimethyl formamide.

In some examples, the milling includes a high energy wet milling process with 0.3 mm Yttria stabilized zirconium oxide grinding media beads. In some examples, ball milling, horizontal milling, attritor milling, or immersion milling can be used. In some examples, using a high energy milling process produces a particle size distribution of about $d_{50}$~100 nm to 5000 nm.

In some examples, the milling may include a classifying step such as sieving, centrifugation, or other known laboratory of separating particles of different size and/or mass.

E. SLURRY

In some examples, the anhydrous, aprotic solvent for use with the slurries described herein includes one or more solvents selected from benzene, toluene, xylene, ethyl acetate, tetrahydrofuran, dioxane, and 1,2-dimethoxyethane, or combinations thereof—optionally with one or more dispersants, optionally with one or more binders, and optionally with one or more plasticizers. In some examples, the solvent includes about 0-35% w/w anhydrous toluene. In some examples, the solvent includes about 0-35% w/w benzene. In some examples, the solvent includes about 0-35% xylene. In some examples, the solvent includes about 0-35% dioxane. In some examples, the solvent includes 0-35% w/w tetrahydrofuran. In some examples, the solvent includes about 0-35% w/w 1,2-dimethoxyethane. In some examples, the dispersant is 0-5% w/w. In some examples, the binder is about 0-10% w/w. In some examples, the plasticizer is 0-10% w/w. In these examples, the garnet or calcined precursor materials represent the remaining % w/w (e.g., 40, 50, 60%, 70%, or 75% w/w).

In some examples, a dispersant is used during the milling process. Examples of dispersants, include, but are not limited to, a dispersant selected from the group consisting of fish oil, fatty acids of degree $C_8$-$C_{20}$ (for example, dodecanoic acid, oleic acid, stearic acid, linolenic acid, linoleic acid), alcohols of degree $C_8$-$C_{20}$ (for example, dodecanol, oleyl alcohol, stearyl alcohol), alkylamines of degree $C_8$-$C_{20}$ (for example, dodecylamine, oleylamine, stearylamine), phosphate esters, phospholipids (for example, phosphatidylcholine, lecithin), polymeric dispersants such as poly(vinylpyridine), poly(ethylene imine), poly(ethylene oxide) and ethers thereof, poly(ethylene glycol) and ethers thereof, polyalkylene amine, polyacrylates, polymethacrylates, poly (vinyl alcohol), poly(vinyl acetate), polyvinyl butyral, maleic anhydride copolymers, glycolic acid ethoxylate lauryl ether, glycolic acid ethoxylate oleyl ether, sodium dodecyl sulfate, sodium dodecylbenzenesulfonate, cetyltrimethylammonium bromide, cetylpyridinium chloride, surfactants and dispersants from the Brij family of surfactants, the Triton family of surfactants, and the Solsperse family of dispersants, the SMA family of dispersants, the Tween family of surfactants, and the Span family of surfactants. Dispersants may be combined.

In some examples, the binders suitable for use with the slurries described herein include binders used to facilitate the adhesion between the Li-stuffed garnet particles, and include, but are not limited to, polypropylene (PP), atactic polypropylene (aPP), isotactic polypropylene (iPP), other polyolefins such as ethylene propylene rubber (EPR), ethylene pentene copolymer (EPC), polyisobutylene (KB), styrene butadiene rubber (SBR), poly(ethylene-co-1-octene) (PE-co-PO), poly(ethylene-co-methylene cyclopentene) (PE-co-PMCP), stereoblock polypropylenes, polypropylene polymethyl pentene, polyethylene oxide (PEO), PEO block copolymers, silicone polymers and copolymers, polyvinyl butyral (PVB), poly(vinyl acetate) (PVAc), polyvinylpyrrolidine (PVP), poly(ethyl methacrylate) (PEMA), acrylic polymers (for example polyacrylates, polymethacrylates, and copolymers thereof), binders from the Paraloid family of resins, binders from the Butvar family of resins, binders from the Mowital family of resins. Binders may be combined.

In some examples, the slurry may also include a plasticizer. A non-limiting list of plasticizers includes dibutyl phthalate, dioctyl phthalate, and benzyl butyl phthalate. Plasticizers may be combined.

F. CASTING

In some processes set forth herein, the processes include casting a tape of ceramic source powder onto a substrate (e.g., porous or nonporous alumina, zirconia, garnet, alumina-zirconia, lanthanum alumina-zirconia). In some examples, the tape is prepared on a substrate such as a silicone coated substrate (e.g., silicone coated Mylar, or silicone coated Mylar on alumina).

Some tape casting processes are known in the relevant field and include those set forth in Mistler, R. E. and Twiname, E. R, *Tape Casting: Theory and Practice*, 1$^{st}$ Edition Wiley-American Ceramic Society; 1 edition (Dec. 1, 2000), the entire contents of which is herein incorporated by reference in its entirety for all purposes. Other casting processes and materials as set forth in U.S. Pat. No. 5,256,609, to Dolhert, L. E., and entitled CLEAN BURNING GREEN TAPE CAST SYSTEM USING ATACTIC POLYPROPYLENE BINDER), the entire contents of which is herein incorporated by reference in its entirety for all purposes. Other casting processes include those described in D. J. Shanefield *Organic Additives and Ceramic Processing*, Springer Science & Business Media, (Mar. 9, 2013) which is herein incorporated by reference.

G. TAPE DRYING AFTER CASTING

In some examples, the processes set forth herein include drying. In some processes, drying includes controlling the temperature of the green tape by, for example, using a heated bed on which to place or deposit casted film, infrared (IR) heating, or convection heating of casted tape. In some processes, drying may include using environmental controls such as, but not limited to, stagnant and, or, flowing environment (e.g., atmospheric air, dry air, inert gas, nitrogen gas, argon gas) to manage or to control the amount of solvent in the drying ambient. In these processes, the drying is used to control the rate of solvent removal and to ensure that the cast film dries from the substrate to the surface as opposed to from the surface to the substrate.

H. SETTER PLATES

In some examples, the green tapes prepared by the processes herein, and those incorporated by reference, are sintered between setter plates. In some examples, the green tapes prepared by the processes herein, and those incorporated by reference, are sintered on at least one setter plate. In some examples, these setter plates are composed of a metal, an oxide, a nitride, or a metal, oxide, or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, nickel setter plates, aluminum (Al) setter plates, alumina setter plates, porous alumina setter plates, steel setter plates, zirconium (Zr) setter plates, zirconia setter plates, porous zirconia setter plates, lithium oxide setter plates, porous lithium oxide setter plates, lanthanum oxide setter plates, porous lanthanum oxide setter plates, garnet setter plates, porous garnet setter plates, lithium-stuffed garnet setter plates, porous lithium-stuffed garnet setter plates, and combinations thereof. In some examples, the setter plates are garnet setter plates or porous garnet setter plates. In some examples, the setter plates include an oxide material with lithium concentration greater than 5 mmol/cm$^3$.

In some examples of the processes described herein, the setter plates and the sintering processes set forth in U.S. Patent No. US20170062873A1, entitled LITHIUM-STUFFED GARNET SETTER PLATES FOR SOLID ELECTROLYTE FABRICATION, and PCT Patent Application No. WO02016168723A1, entitled SETTER PLATES FOR SOLID ELECTROLYTE FABRICATION AND PROCESSES OF USING THE SAME TO PREPARE DENSE SOLID ELECTROLYTES, filed on Oct. 20, 2016, are incorporated herein by reference in its entirety.

In some examples, the green tapes prepared by the processes herein, and those set forth in WO 2016/168691; WO 2016/168723; US 2017/0062873; US 2017/0153060; and US 2018-0045465 A1, each of which is incorporated by reference in their entirety, are sintered between setter plates in which a metal powder is positioned between the setter plate and the green tape. In certain examples, the setter plates are selected from the group consisting of platinum (Pt) setter plates, palladium (Pd) setter plates, gold (Au) setter plates, copper (Cu) setter plates, nickel setter plates, aluminum (Al) setter plates, alumina setter plates, porous alumina setter plates, steel setter plates, zirconium (Zr) setter, zirconia setter plates, porous zirconia setter plates, lithium oxide setter plates, porous lithium oxide setter plates, lanthanum oxide setter plates, lithium zirconium oxide (Li$_2$ZrO$_3$) setter plates, lithium aluminum oxide (LiAlO$_2$) setter plates, porous lanthanum oxide setter plates, Lithium zirconium oxide (Li$_2$ZrO$_3$) setter plates, lithium aluminum oxide (LiAlO$_2$) setter plates, garnet setter plates, porous garnet setter plates, lithium-stuffed garnet setter plates, and porous lithium-stuffed garnet setter plates, and combinations of the aforementioned. In some examples, the setter plates include an oxide material with lithium concentration greater than 5 mmol/cm$^3$. In these particular examples, the metal powder is selected from Ni power, Cu powder, Au powder, Fe powder, or combinations thereof. The metal powder may additionally include ceramic material.

In some examples, the green tapes prepared by the processes herein, and those incorporated by reference, are sintered between setter plates in which a metal layer or film is positioned between the setter plate and the green tape. In some examples, these setter plates are composed of a metal, an oxide, a nitride, or a metal, oxide or nitride with an organic or silicone laminate layer thereupon. In certain examples, the setter plates are selected from the group consisting of platinum (Pt) setter plates, palladium (Pd) setter plates, gold (Au) setter plates, copper (Cu) setter plates, nickel setter plates, aluminum (Al) setter plates, alumina setter plates, porous alumina setter plates, steel setter plates, zirconium (Zr), zirconia setter plates, porous zirconia setter plates, lithium oxide setter plates, porous lithium oxide setter plates, lanthanum oxide setter plates, porous lanthanum oxide setter plates, garnet setter plates, porous garnet setter plates, lithium-stuffed garnet setter plates, porous lithium-stuffed garnet setter plates, magnesia setter plates, porous magnesia setter plates. In some examples, the setter plates include an oxide material with lithium concentration greater than 5 mmol/cm$^3$. In these particular examples, the metal powder is selected from Ni power, Cu powder, Mg powder, Mn power, Au powder, Fe powder, or combinations thereof. The metal powder may additionally include ceramic material.

During certain sintering conditions, a layer of particles (e.g., a setter sheet) or powder may be placed between the green tape and the setter plates to assist with the sintering of the green tape. As some of the green tape sinters, it tends to shrink and densify which, if not controlled, may lead to cracking or other mechanical defects in the film. In some of these examples, the layer of particles comprises a uniform layer of particles. In some other of these examples, the layer of particles comprises a uniform layer of inert, or non-reactive with the green tape, particles. In some sintering conditions, the layer of particles is provided as a sheet of particles. In some examples, the thickness of the sheet or layer or particles is about equal to the size of the particles in the sheet or layer. In other examples, the inert particles positions between the green tape and the setter plate(s) is positioned between the contact surfaces of the green tape and the parts of the green tape which are being sintered. In some continuous sintering processes, the setter plates and, or, the particles, layers, or sheets which are placed between the setter plates and the green tape, may be moved or repositioned during the sintering process so that a continuous roll of sintered film is prepared in a continuous process. In these continuous processes, the setter plates and the particles, layers, or sheets, move in conjunction with the movement of the green tape so that the portion of the green tape being sintering is in contact with the particles, layers, or sheets which are also in contact with the setter plates. In some instances, the layers or sheets are prepared with a particular weight to prevent tape warping and surface deterioration.

In some of the examples described herein, the layer or sheet of inert and, or, uniform particles (or powders) assists the sintering process by providing a minimal amount of friction between the green tape and the setter plates so that the green tape is not strained as it sinters and reduces in volume and increases in density. By reducing the friction forces, the green tape can shrink with minimal stress during the sintering process. This provides for improved sintered films that do not stick to the setter plates, which do not distort during the sintering process, and which do not crack during the sintering process or thereafter.

In some examples described herein, other setter plates may be used, for example in combination with the lithium-stuffed garnet setter plates described herein, so long as that other setter plate has a high melting point, a high lithium activity, and a stability in reducing environment. Some examples of these other materials include a member selected from $Li_2ZrO_3$, $xLi_2O-(1-x)SiO_2$ (where $x=0.01-0.99$), $aLi_2O-bB_2O_3-cSiO_2$ (where $a+b+c=1$), $LiLaO_2$, $LiAlO_2$, $Li_2O$, $Li_3PO_4$, a Li-stuffed garnet, or combinations thereof. Additionally, these other setter plates should not induce a chemical potential in the sintering film which results in Li diffusion out of the sintering film and into the setter plate. Additional materials include lanthanum aluminum oxide, pyrochlore and materials having a lithium concentration of greater than 0.01 mol/cm$^3$. In some examples, setter plates may include materials having a lithium concentration of greater than 0.02 mol/cm$^3$. In some examples, setter plates may include materials having a lithium concentration of greater than 0.03 mol/cm$^3$. In some examples, setter plates may include materials having a lithium concentration of greater than 0.04 mol/cm$^3$. In some examples, setter plates may include materials having a lithium concentration of greater than 5 mmol/cm$^3$. In some examples, setter plates may include materials having a lithium concentration of between 10-15 mmol/cm$^3$. In some examples, the setter material may be provided as a powder or in a non-planar shape.

I. SINTERING

The green tapes set forth herein can be sintered by sintering processes set forth in International Patent Application Publication No. WO 2015/076944, which is the published version of International Patent Application No. PCT/US2014/059578, entitled Garnet Materials for Li Secondary Batteries and Methods of Making and Using Garnet Materials, filed Oct. 7, 2014, which is incorporated by reference herein in its entirety for all purposes.

The green tapes set forth herein can be sintered in ovens open to the non-reactive environment. In some examples, the green tapes are sintered in an $O_2$ rich atmosphere at dew point below −40° C. In other examples, the green tapes are sintered in an argon rich atmosphere at dew point below −40° C. In yet other examples, the green tapes are sintered in an $Ar/H_2$ atmosphere at dew point below −40° C. In other examples, the green tapes are sintered in a nitrogen rich atmosphere at dew point below −40° C. In yet other examples, the green tapes are sintered in an $N_2/H_2$ atmosphere at dew point below −40° C. In other examples the green tapes are sintered in an argon/$H_2O$ atmosphere. In some examples, the atmosphere used to sinter the green tapes is not the same as the atmosphere used to cool the film after they have been sintered.

In some examples, the process includes sintering the green tape, wherein sintering comprises heat sintering. In some of these examples, heat sintering includes heating the green tape in the range from about 700° C. to about 1200° C. for about 1 to about 600 minutes and in atmosphere having an oxygen partial pressure in the range of 1e-1 atm to 1e-15 atm.

In any of the processes set forth herein, heat sintering may include heating the green tape in the range from about 700° C. to about 1250° C.; or about 800° C. to about 1200° C.; or about 900° C. to about 1200° C.; or about 1000° C. to about 1200° C.; or about 1100° C. to about 1200° C. In any of the processes set forth herein, heat sintering can include heating the green tape in the range from about 700° C. to about 1100° C.; or about 700° C. to about 1000° C.; or about 700° C. to about 900° C.; or about 700° C. to about 800° C. In any of the processes set forth herein, heat sintering can include heating the green tape to about 700° C., about 750° C., about 850° C., about 800° C., about 900° C., about 950° C., about 1000° C., about 1050° C., about 1100° C., about 1150° C., or about 1200° C. In any of the processes set forth herein, heat sintering can include heating the green tape to 700° C., 750° C., 850° C., 800° C., 900° C., 950° C., 1000° C., 1050° C., 1100° C., 1150° C., or 1200° C. In any of the processes set forth herein, heat sintering can include heating the green tape to 700° C. In any of the processes set forth herein, heat sintering can include heating the green tape to 750° C. In any of the processes set forth herein, heat sintering can include heating the green tape to 850° C. In any of the processes set forth herein, heat sintering can include heating the green tape to 900° C. In any of the processes set forth herein, heat sintering can include heating the green tape to 950° C. In any of the processes set forth herein, heat sintering can include heating the green tape to 1000° C. In any of the processes set forth herein, heat sintering can include heating the green tape to 1050° C. In any of the processes set forth herein, heat sintering can include heating the green tape to 1100° C. In any of the processes set forth herein, heat sintering can include heating the green tape to 1125° C. In any of the processes set forth herein, heat sintering can include heating the green tape to 1150° C. In any of the processes set forth herein, heat sintering can include heating the green tape to 1200° C.

In any of the processes set forth herein, the processes may include heating the green tape for about 1 to about 600 minutes. In any of the processes set forth herein, the processes may include heating the green tape for about 20 to about 600 minutes. In any of the processes set forth herein, the processes may include heating the green tape for about 30 to about 600 minutes. In any of the processes set forth herein, the processes may include heating the green tape for about 40 to about 600 minutes. In any of the processes set forth herein, the processes may include heating the green tape for about 50 to about 600 minutes. In any of the processes set forth herein, the processes may include heating the green tape for about 60 to about 600 minutes. In any of the processes set forth herein, the processes may include heating the green tape for about 70 to about 600 minutes. In any of the processes set forth herein, the processes may include heating the green tape for about 80 to about 600 minutes. In any of the processes set forth herein, the processes may include heating the green tape for about 90 to about 600 minutes. In any of the processes set forth herein, the processes may include heating the green tape for about 100 to about 600 minutes. In any of the processes set forth herein, the processes may include heating the green tape for about 120 to about 600 minutes. In any of the processes set forth herein, the processes may include heating the green tape for about 140 to about 600 minutes. In any of the processes set forth herein, the processes may include heating the green tape for about 160 to about 600 minutes. In any of the processes set forth herein, the processes may include heating the green tape for about 180 to about 600 minutes. In any of the processes set forth herein, the processes may include heating the green tape for about 200 to about 600 minutes. In any of the processes set forth herein, the processes may include heating the green tape for about 300 to about 600 minutes. In any of the processes set forth herein, the processes may include heating the green tape for about 350 to about 600 minutes. In any of the processes set forth herein, the processes may include heating the green tape for about 400 to about 600 minutes. In any of the processes set forth herein, the processes may include heating the green tape for about 450 to about 600 minutes. In any of the processes set forth herein, the processes may include heating the green tape for about 500 to about 600 minutes. In any of the processes set forth herein, the processes may include heating the green tape for about 1 to about 500 minutes. In any of the processes set forth herein, the processes may include heating the green tape for about 1 to about 400 minutes. In any of the processes set forth herein, the processes may include heating the green tape for about 1 to about 300 minutes. In any of the processes set forth herein, the processes may include heating the green tape for about 1 to about 200 minutes. In any of the processes set forth herein, the processes may include heating the green tape for about 1 to about 100 minutes. In any of the processes set forth herein, the processes may include heating the green tape for about 1 to about 50 minutes.

In some examples, the sintering process may include sintering within a closed, but not sealed, furnace (i.e., oven, heating chamber). In some of these examples, the green tape is placed between setter plates, optionally with setter sheets or layers there between as well, and the green tape for sintering is placed next to, or in close proximity to, a sacrificial source of Li. This sacrificial source of Li helps to prevent Li loss by way of evaporation from the sintering garnet. In some examples, the closed system includes Argon gas, a mixture of Argon gas and either Hydrogen gas or water, Air, purified Air, or Nitrogen. In some of these examples, the sacrificial source of Li has a higher surface area than the surface area of the green tape which is sintered. In some examples, the Li source and the sintering green tape have the same type of lithium-stuffed garnets.

In some examples, the porosity of the green tape after firing is less than 10% by volume. In some examples, the porosity of the green tape after firing is less than 9% by volume. In some examples, the porosity of the green tape after firing is less than 8% by volume. In some examples, the porosity of the green tape after firing is less than 7% by volume. In some examples, the porosity of the green tape after firing is less than 6% by volume. In some examples, the porosity of the green tape after firing is less than 5% by volume. In some examples, the porosity of the green tape after firing is less than 4% by volume. In some examples, the porosity of the green tape after firing is less than 3% by volume. In some examples, the porosity of the green tape after firing is less than 2% by volume. In some examples, the porosity of the green tape after firing is less than 1% by volume. In some examples, the green tape porosity is determined by image analysis of cross-section FIB images.

In some embodiments, sintering instruments used included 3" laboratory tube furnace with controlled atmosphere in the partial pressure oxygen range of $1e^{-1}$ to $1e^{-20}$ atm with a custom temperature and gas flow control system.

J. SINTERING WITH OTHER DEVICE COMPONENTS

In certain examples, the green tapes are sintered while in contact with other components with which the post-sintered green tapes would be combined if used in an electrochemical device. For example, in some examples, the green tapes are layered or laminated to a positive electrode composition so that after sintering the green tape, the sintered green tape is adhered to the positive electrode. In another example, the green tape is sintered while in contact with a metallic powder (e.g., nickel (Ni) powder). As the green tape sinters, and the metal powder densifies into a solid metal foil, the sintering green tape bonds to the metal foil. The advantage of these sintering conditions is that more than one component of an electrochemical device can be prepared in one step, thus saving manufacturing time and resources.

K. MEASURING

In some embodiments, SEM Electron microscopy was performed in a Helios 600i or FEI Quanta for measurement. In some embodiments, surface roughness was measured by an optical microscope such as the Keyence VR that may measure height and calculate a roughness value. In some embodiments, powder density was measured using a pycnometer. In some embodiments, green tape density was measured using geometric process or by using Archimedes process. In some embodiments, variance in green tape thickness was measured using beta-gague, micrometer, or cross-section images.

L. EXAMPLES

Example 1—Process for Making Calcined Lithium-Stuffed Garnet Powder

Calcined lithium-stuffed garnet powder was produced by the following series of steps. First, lithium hydroxide (LiOH), aluminum nitrate [$Al(NO_3)_3 9H_2O$], zirconia ($ZrO_2$), and lanthanum oxide ($La_2O_3$) were massed (i.e., weighed) and mixed into a combination wherein the molar ratio of the constituent elements was $Li_{7.1}Zr_2La_3O_{12}+$ $0.5Al_2O_3$. This combination was mixed and milled, using wet-milling techniques and $ZrO_2$ milling media, until the combination had a $d_{50}$ particle size of 100 nm-5 µm. Also included with the milling media was a dispersant. In some examples, also included was a solvent. The milled combination of reactants was separated from the milling media after milling to the $d_{50}$ particle size. The separated milled reactants were then placed in an alumina crucible and calcined in a non-reactive environment at about eight-hundred to nine-hundred degrees Celsius (900° C.) for approximately two to six hours in an oven with a controlled oxidizing atmosphere in contact with the calcining reactants. The calcination process burned and/or combusted residual solvents as well as the dispersant, and surfactant. The calcination caused the inorganic reactants to react to form the lithium-stuffed garnet. The calcined product was removed from the alumina crucibles after it cooled to room temperature in a non-reactive environment. The product was characterized by a variety of analytical techniques, including x-ray powder diffraction (XRD) and scanning electron microscopy. This product is referred to as calcined lithium-stuffed garnet and has an empirical formula of approximately was $Li_{7.1}Zr_2La_3O_{12}+0.5Al_2O_3$.

Example 2—Process for Making and Drying a High Density Green Tape 1000-1500 g of calcined lithium-stuffed garnet powder from Example 1 was added to 400-700 g of anhydrous aprotic solvent such as hexane, THF, or methylene chloride along with 20-45 g of oleic acid in a milling vessel in an argon glove box. The mixture was milled for 2-6 hours on a Hockmeyer mill with zirconium oxide media until the median particle size of <750 nm was measured using Horiba model LA-950 V2 at refractive index of 2.13.

200-600 g of the milled garnet slurry from the step above was mixed in a non-reactive environment. The non-reactive environment was a dry room that was at 1 atmosphere in pressure. The ambient atmosphere was dry air. The dry air had a dew point less than 10° C. A mixture of 20-45 g of Paraloid B-72 resin and 10-30 g of benzyl butyl phthalate dissolved in the same solvent used for milling was added to the milled garnet slurry in a non-reactive environment, to give a final slurry solids content of approximately 45-60% w/w. The slurry was mixed in a FlackTek SpeedMixer for 10-30 min in a non-reactive environment. Next, a green tape was prepared by casting the mixed slurry onto a substrate by doctor blading in a non-reactive environment. The cast mixed slurry was allowed to dry in a non-reactive environment at room temperature for 2-6 hours to form a green tape. The geometric density of the dried green tape was subsequently measured to be >2.9 g/cm³.

The same work was completed in ambient air; the geometric density of the dried green tape was measured to be 2.5 g/cm³.

Example 3—Preparation of Another High Density Green Tape

This example shows a process for making another high density green tape made using different dispersant. 1000-1500 g of calcined lithium-stuffed garnet powder from Example 1 was added to 400-700 g of anhydrous aprotic solvent such as hexane, THF, or methylene chloride and 20-35 g of Solsperse M387 dispersant in a milling vessel in an argon glovebox. The mixture was milled for 2-6 hours on a Hockmeyer mill with zirconium oxide media until the median particle size of <750 nm was measured using Horiba model LA-950 V2 at refractive index of 2.13.

200-600 g of the milled garnet slurry from the step above was mixed in a non-reactive environment. A mixture of 20-45 g of Paraloid B-72 resin and 10-30 g of benzyl butyl phthalate dissolved in the same solvent used for milling was added to the milled garnet slurry in a non-reactive environment, to give a final slurry solids content of approximately 45-60% w/w. The slurry was mixed in a FlackTek Speed-Mixer for 10-30 min in a non-reactive environment. Next, a green tape was prepared by casting the mixed slurry onto a substrate by doctor blading in a non-reactive environment. The cast mixed slurry was allowed to dry in a non-reactive environment at room temperature for 2-6 hours to form a green tape.

The same work was completed in ambient air; the geometric density of the dried green tape was measured to be 2.5 g/cm³.

Figure 2:
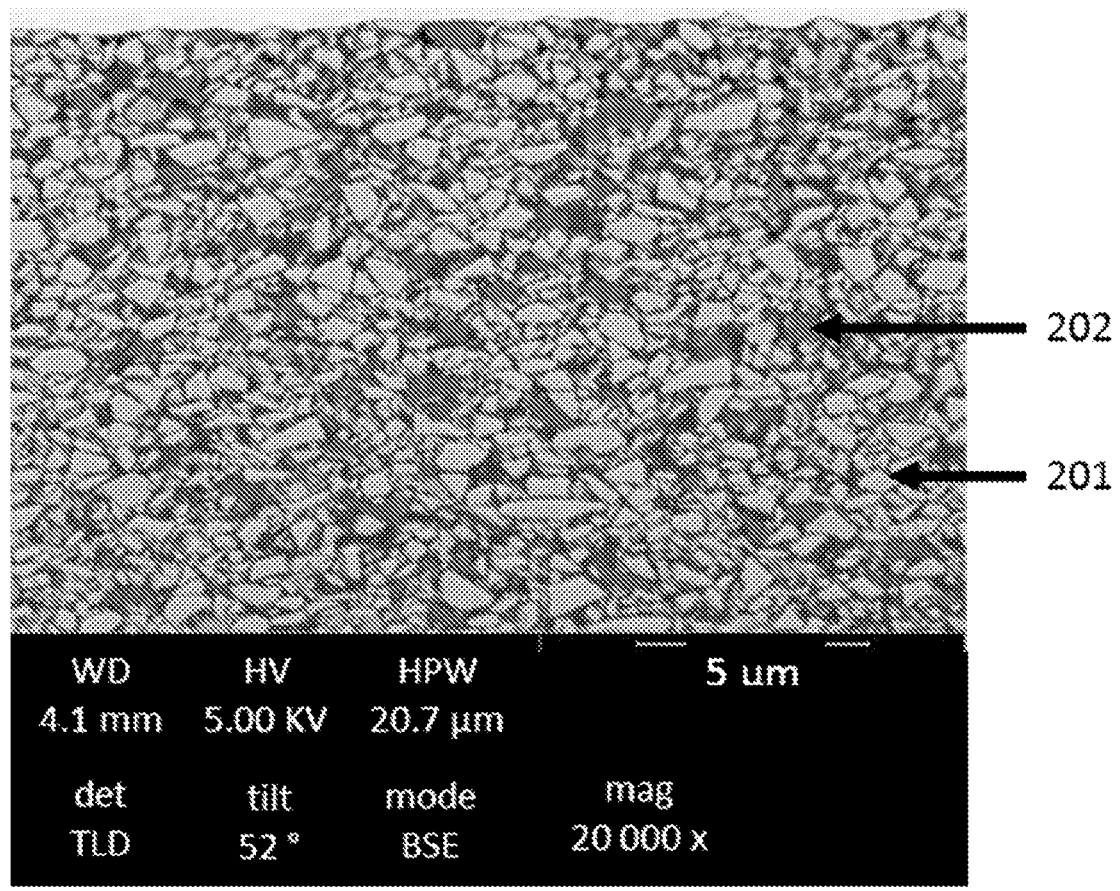
FIG. 2 shows a scanning electron microscopy (SEM) image of a green tape made by the casting process set forth in Example 1. The organic portion is labeled 201, and the lithium-stuffed garnet portion is labeled 202.

FIG. 2 shows a scanning electron microscopy (SEM) image of a green tape made by the casting processes set forth in this Example 3. The tape included 81 wt % garnet, 19 wt % organic content, and had a geometric density of 3.0 g/cm³.

Figure 3:
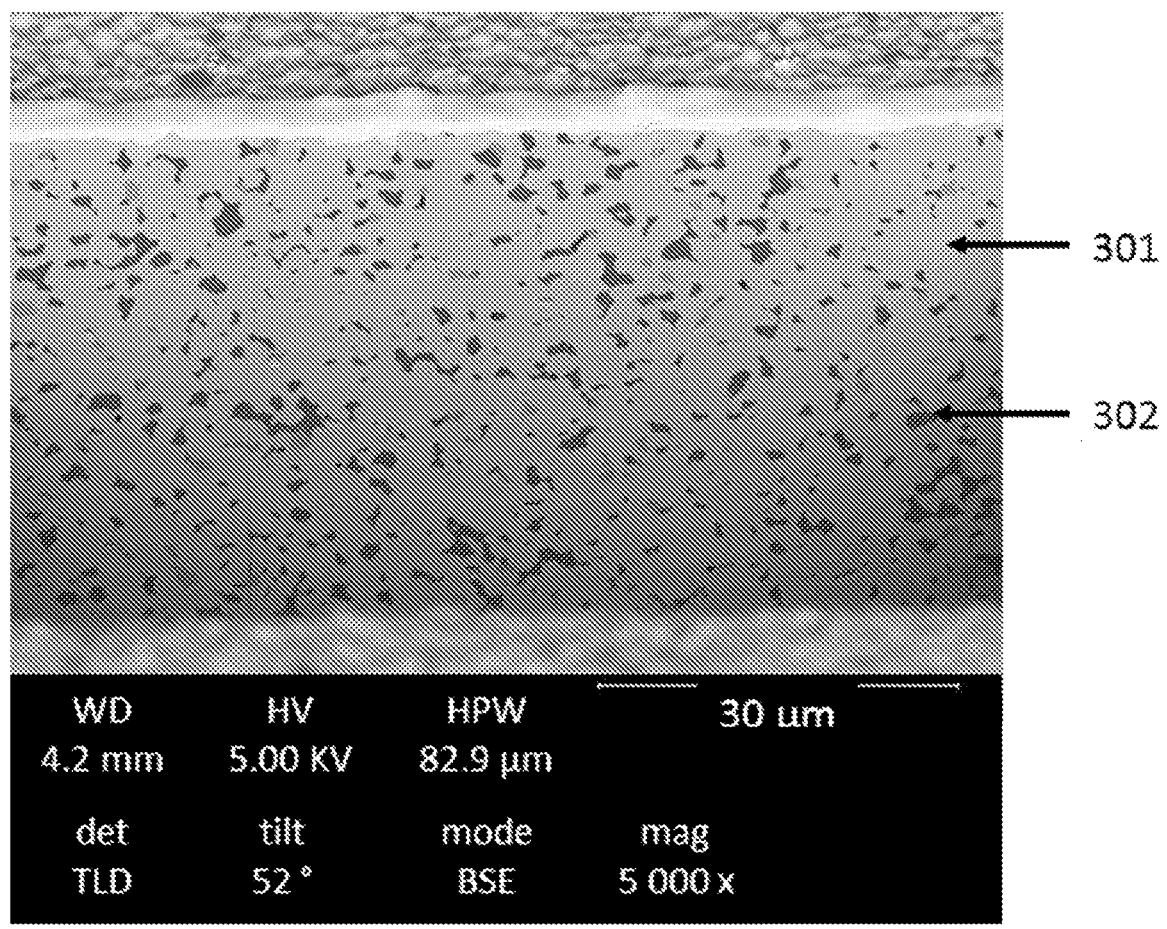
FIG. 3 shows a scanning electron microscopy (SEM) image of a sintered green tape made by Example 1. The organic portion is labeled 301, and the garnet portion is labeled 302.

FIG. 3 shows a scanning electron microscopy (SEM) image of a sintered tape made by sintering the green tape made in Example 2. The density of the sintered green tape was measured by Archimedes process to be >4.7 g/cm³.

Figure 4:
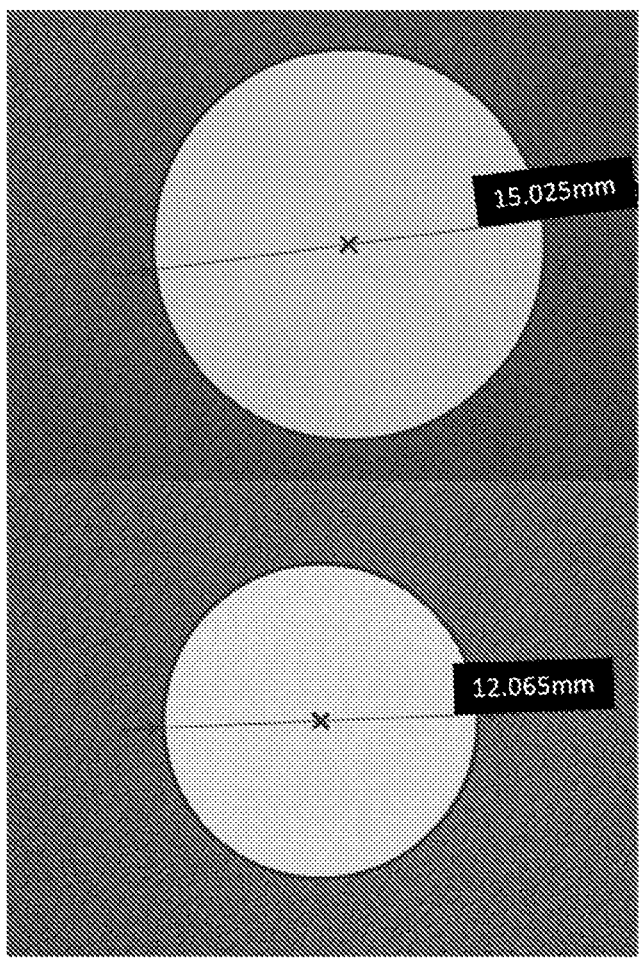
FIG. 4 shows optical microscope images of a disc of green tape made by Example 1 before sintering, and the resulting disc obtained after sintering. The green tape disc is labeled 401, and the sintered disc is labeled 402.

FIG. 4 shows optical microscope images of a disc of green tape made by Example 1 before sintering, and the resulting disc obtained after sintering. Shrinkage during sintering was measured as 20%, based on decrease in disc diameter. The shrinkage was 26% for a green tape that was prepared in ambient air.

Example 4: Sintering of Green Tape

In this example, the green tape was prepared as in Example 1 or 2. In one example, multiple green tapes were stacked and laminated together. The laminated green tapes were sintered by placing them between two porous garnet setter plates, and then removed from the setter plates. The green tapes were sintered, in one example, at 1100° C. for 1-5 hours. In another example, the tapes were sintered at 1125° C. for 1-5 hours. In another example, the tapes were sintered at 1150° C. for 1-5 hours. Prior to the sintering, de-bindering was performed in Ar gas. In one example, a mixture of Ar gas and water was used for de-bindering. In another example a mixture of Ar gas and purified air was used for de-bindering. During sintering the atmosphere around the sintering green tape had a $PO_2$ in the range $0.5\text{-}10^{-20}$ atm.

The foregoing description of the embodiments of the disclosure has been presented for the purpose of illustration; it is not intended to be exhaustive or to limit the claims to the precise forms disclosed. Persons skilled in the relevant art can appreciate that using no more than routine experimentation, numerous equivalents, modifications and variations are possible in light of the above disclosure.

What is claimed is:

1. A process for making a high density green tape, the process comprising:
   (a) providing a slurry comprising a source powder;
   (b) mixing the slurry with a binder solution in a non-reactive environment;
   (c) casting the slurry to form a green tape in a non-reactive environment; and
   (d) drying the green tape in a non-reactive environment to achieve a geometric density greater than 2.9 g/ml;

wherein the at least one source powder is selected from the group consisting of lithium-stuffed garnet, chemical precursors to lithium-stuffed garnet, and lithium-stuffed garnet with aluminum oxide dopants;

wherein at least one source has a particle size distribution $d_{50}$ of 100 nm-200 nm, 200 nm-300 nm, 300 nm-400 nm, 400 nm-500 nm, 500 nm-600 nm, 600 nm-700 nm, 700 nm-800 nm, 800 nm-900 nm, 900 nm-1 µm, 1 µm-2 µm, or 2 µm-3 µm;

wherein the non-reactive environment comprises nitrogen gas or argon gas, or a combination thereof, and a humidity at −10° C. to −20° C., at −20° C. to −30° C., at −30° C. to −40° C., at −40° C. to −50° C., or at −50° C. to −60° C. dew point;

wherein the process further comprises milling at least one source powder in a non-reactive environment in an anhydrous aprotic solvent;

wherein the aprotic solvent is selected from the group consisting of: benzene, toluene, xylene, ethyl acetate, tetrahydrofuran, dioxane, and 1,2-dimethoxyethane; and further comprising milling the source powder until the source powder has a particle size distribution $d_{50}$ of 100 nm-200 nm, 200 nm-300 nm, 300 nm-400 nm, 400 nm-500 nm, 500 nm-600 nm, 600 nm-700 nm, or 700 nm-750 nm.

2. The process of claim 1, wherein the source powder is calcined in a non-reactive environment to achieve geometric density greater than 4.7 g/ml.

3. The process of claim 1, wherein the amount of source powder in the green tape is at least 50%, 55%, 55%, 60%, 65%, 70%, 75%, 80%, 85%, or 90% by weight.

4. The process claim 1, wherein the lithium-stuffed garnet is a material selected from the group consisting of: $Li_A La_B M'_C M''_D Zr_E O_F$, wherein $4<A<8.5$, $1.5<B<4$, $0 \leq C \leq 2$, $0 \leq D \leq 2$; $0 \leq E < 2.5$, $10 < F \leq 13.5$, and M' and M'' are each, independently in each instance selected from Al, Mo, W, Nb, Sb, Ca, Ba, Sr, Ce, Hf, Rb, Ga, and Ta.

5. The process of claim 1, further comprising, prior to step (c) or step (d), mixing the slurry of the modified source powder in a non-reactive environment with a binder selected from the group consisting of polypropylene (PP), atactic polypropylene (aPP), isotactic polypropylene (iPP), ethylene propylene rubber (EPR), ethylene pentene copolymer (EPC), polyisobutylene (PIB), styrene butadiene rubber (SBR), poly(ethylene-co-1-octene) (PE-co-PO), poly(ethylene-co-methylene cyclopentene) (PE-co-PMCP), stereoblock polypropylenes, polypropylene polymethyl pentene, polyethylene oxide (PEO), PEO block copolymers, silicone polymers and copolymers, polyvinyl butyral (PVB), poly(vinyl acetate) (PVAc), polyvinylpyrrolidine (PVP), poly(ethyl methacrylate) (PEMA), acrylic polymers, binders from the Paraloid family of resins, binders from the Butvar family of resins, binders from the Mowital family of resins, and combinations thereof.

6. The process of claim 1, further comprising, in step (b), milling the slurry of the modified source powder, with a dispersant selected from the group consisting of fish oil, fatty acids of degree $C_8$-$C_{20}$, alcohols of degree $C_8$-$C_{20}$, alkylamines of degree $C_8$-$C_{20}$, phosphate esters, phospholipids, polymeric dispersants such as poly(vinylpyridine), poly(ethylene imine), poly(ethylene oxide) and ethers thereof, poly(ethylene glycol) and ethers thereof, polyalkylene amine, polyacrylates, polymethacrylates, poly(vinyl alcohol), poly(vinyl acetate), polyvinyl butyral, maleic anhydride copolymers, glycolic acid ethoxylate lauryl ether, glycolic acid ethoxylate oleyl ether, sodium dodecyl sulfate, sodium dodecylbenzenesulfonate, cetyltrimethylammonium bromide, cetylpyridinium chloride, surfactants and dispersants from the Brij family of surfactants, the Triton family of surfactants, the Solsperse family of dispersants, the SMA family of dispersants, the Tween family of surfactants, and the Span family of surfactants.

7. The process of claim 6, wherein the fatty acids of degree $C_8$-$C_{20}$ are selected from dodecanoic acid, oleic acid, stearic acid, linolenic acid, and/or linoleic acid.

8. The process claim 6, wherein the alcohols of degree $C_8$-$C_{20}$ are selected from dodecanol, oleyl alcohol, stearyl alcohol, and combinations thereof.

9. The process of claim 6, wherein the alkylamines of degree $C_8$-$C_{20}$ are selected from dodecylamine, oleylamine, stearylamine, and combinations thereof.

10. The process of claim 6, wherein the phospholipids are selected from phosphatidylcholine, lecithin, and combinations thereof.

11. The process of claim 1, further comprising, prior to step (c) or step (d), mixing the slurry of the source powder in a non-reactive environment with a plasticizer selected from dibutyl phthalate, dioctyl phthalate, and benzyl butyl phthalate.

12. The process of claim 1, wherein the slurry has a solids loading of 1 wt % to 99 wt % and wherein the solid loading refers to the amount of source powder.

13. The process of claim 1, wherein the slurry when dried comprises the source powder at 80% wt/wt.

14. The process of claim 1, wherein the slurry when dried comprises about 10-25% wt/wt organic content and wherein the organic content comprises slurry components other than the source powder.

15. The process of claim 1, wherein the green tape comprises particles of a lithium-stuffed garnet, wherein the green tape has a density greater than 2.9 g/cm$^3$ as measured by geometric density.

16. The process of claim 1, further comprising sintering the green tape.

17. The process of claim 1, wherein the non-reactive environment is the same non-reactive environment in each step.

* * * * *